United States Patent
Holenstein et al.

(10) Patent No.: US 9,830,223 B1
(45) Date of Patent: Nov. 28, 2017

(54) METHODS FOR REPAIRING A CORRUPTED DATABASE TO A NEW, CORRECT STATE

(71) Applicant: Intel Corporation, Santa Clara, CA (US)

(72) Inventors: Paul J. Holenstein, Downingtown, PA (US); John R. Hoffmann, Kennett Square, PA (US); Jonathan M. Ziegler, Audubon, PA (US); Bruce D. Holenstein, Media, PA (US); Wilbur H. Highleyman, Blairstown, NJ (US)

(73) Assignee: Intel Corporation, Santa Clara, CA (US)

( * ) Notice: Subject to any disclaimer, the term of this patent is extended or adjusted under 35 U.S.C. 154(b) by 343 days.

(21) Appl. No.: 14/605,000

(22) Filed: Jan. 26, 2015

(51) Int. Cl.
*G06F 11/14* (2006.01)
(52) U.S. Cl.
CPC .............................. *G06F 11/1402* (2013.01)
(58) Field of Classification Search
None
See application file for complete search history.

(56) References Cited

U.S. PATENT DOCUMENTS

| | | | |
|---|---|---|---|
| 6,745,209 B2 * | 6/2004 | Holenstein | G06F 17/30578 707/615 |
| 6,769,074 B2 | 7/2004 | Vaitzblit | |
| 7,003,531 B2 | 2/2006 | Holenstein et al. | |
| 7,181,476 B2 | 2/2007 | Lee et al. | |
| 7,321,904 B2 | 1/2008 | Holenstein et al. | |
| 7,636,741 B2 * | 12/2009 | Kulesza | G06F 11/1469 |
| 7,801,851 B2 | 9/2010 | Holenstein et al. | |
| 7,853,561 B2 | 12/2010 | Holenstein et al. | |
| 7,865,471 B1 | 1/2011 | Stagg | |
| 7,882,062 B2 | 2/2011 | Holenstein et al. | |
| 7,949,640 B2 | 5/2011 | Holenstein et al. | |
| 8,234,517 B2 * | 7/2012 | Bamford | G06F 17/30575 714/15 |
| 8,296,271 B1 * | 10/2012 | Richardson | G06F 11/1469 707/640 |
| 8,364,648 B1 * | 1/2013 | Sim-Tang | G06F 17/30368 707/674 |
| 8,386,440 B2 * | 2/2013 | Lomet | G06F 11/1474 707/676 |
| 8,527,462 B1 * | 9/2013 | Talius | G06F 17/30088 707/639 |

(Continued)

OTHER PUBLICATIONS

W. H. Highleyman, P. J. Holenstein, B. D. Holenstein, Chapter 10, Referential Integrity, Breaking the Availability Barrier: Survivable Systems for Enterprise Computing; AuthorHouse, 2004, 55 pages.

(Continued)

*Primary Examiner* — Hung Le
(74) *Attorney, Agent, or Firm* — Schwabe, Williamson & Wyatt, P.C.

(57) ABSTRACT

A corrupted database is returned to a correct state by rolling forward or backward through a change queue and applying changes to the database in a selective manner. Changes that did not cause the corruption are applied without modification when rolling forward or are skipped when rolling backward. Changes that caused corruption are addressed when rolling forward, such as by being ignored or modified and then applied. Changes that caused corruption are corrected when rolling backward.

15 Claims, 17 Drawing Sheets

(56) References Cited

U.S. PATENT DOCUMENTS

| | | | |
|---|---|---|---|
| 8,903,779 B1 | 3/2014 | Holenstein et al. | |
| 8,909,604 B1 | 3/2014 | Holenstein et al. | |
| 2003/0037029 A1* | 2/2003 | Holenstein | G06F 17/30578 |
| 2005/0066235 A1* | 3/2005 | Lange-Last | G06F 11/1471 |
| | | | 714/38.1 |
| 2008/0162590 A1* | 7/2008 | Kundu | G06F 11/1471 |
| 2011/0106776 A1* | 5/2011 | Vik | G06F 9/4443 |
| | | | 707/698 |
| 2011/0302136 A1* | 12/2011 | Lakshminath | G06F 9/466 |
| | | | 707/634 |
| 2014/0095452 A1* | 4/2014 | Lee | G06F 11/1471 |
| | | | 707/683 |

OTHER PUBLICATIONS

Chapter 19 entitled "Undoing data changes with the Reverse utility" of Oracle GoldenGate Windows and Linux Administrator's Guide, 11g Release 2 Patch Set 1 (11.2.1.0.1), E29397-1, Copyright © 2012, pp. 277-284, downloaded from web page: http://docs.oracle.com/cd/E35209_01/doc.1121/e29397.pdf, 10 pages.

Section 5.1 entitled "Restore Points and Flashback Database: Concepts," of Oracle Database Backup and Recovery Basics, 10g Release 2 (10.2), Part No. B14192-03, Copyright © 2003, 2005, downloaded from web page: http://docs.oracle.com/cd/B19306_01/backup.102/b14192/rpfbdb001.htm, 7 pages.

* cited by examiner

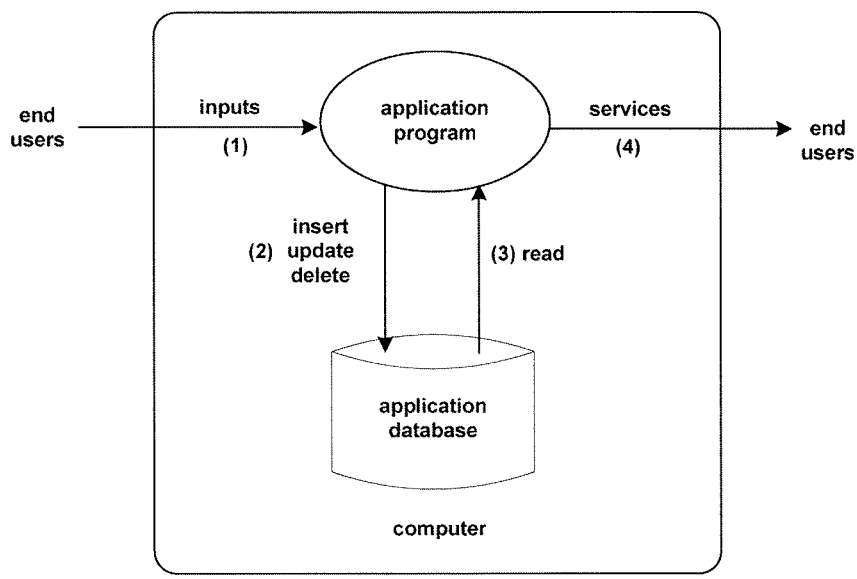
Figure 1: Prior Art - An Application
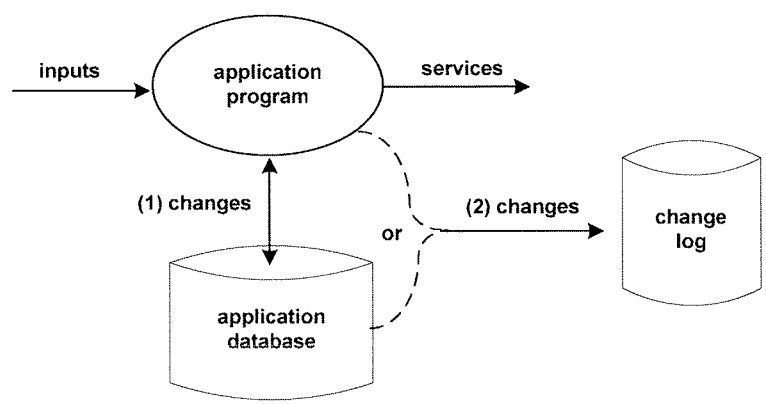
Figure 2: Prior Art - The Change Log

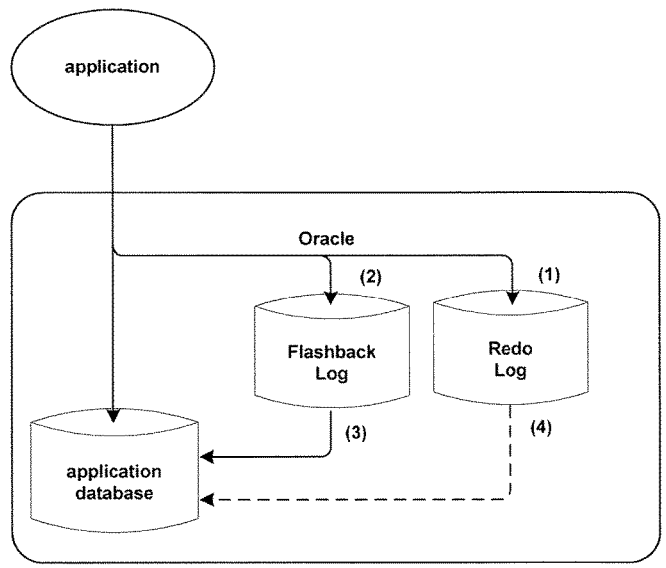
Figure 3: Prior Art - Oracle Flashback
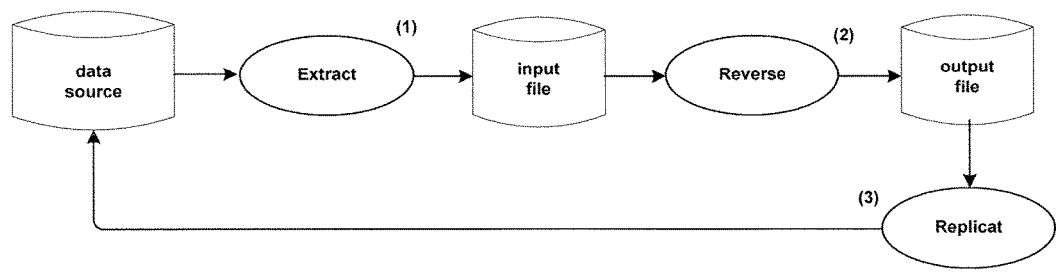
Figure 4: Prior Art – Oracle GoldenGate Reverse

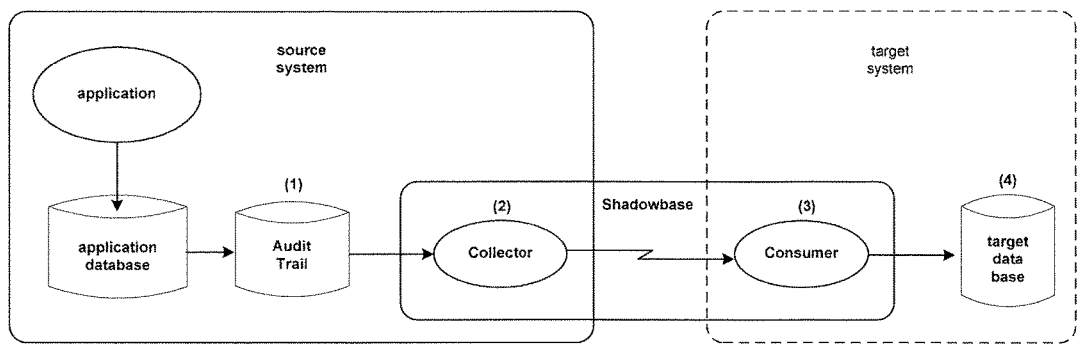
Figure 5: Prior Art – Shadowbase Data Replication Engine
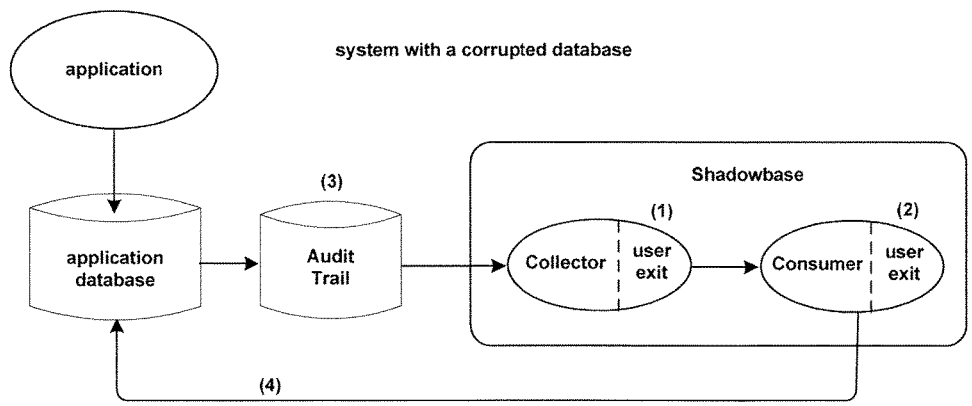
Figure 6: Prior Art - Shadowbase Database Recovery

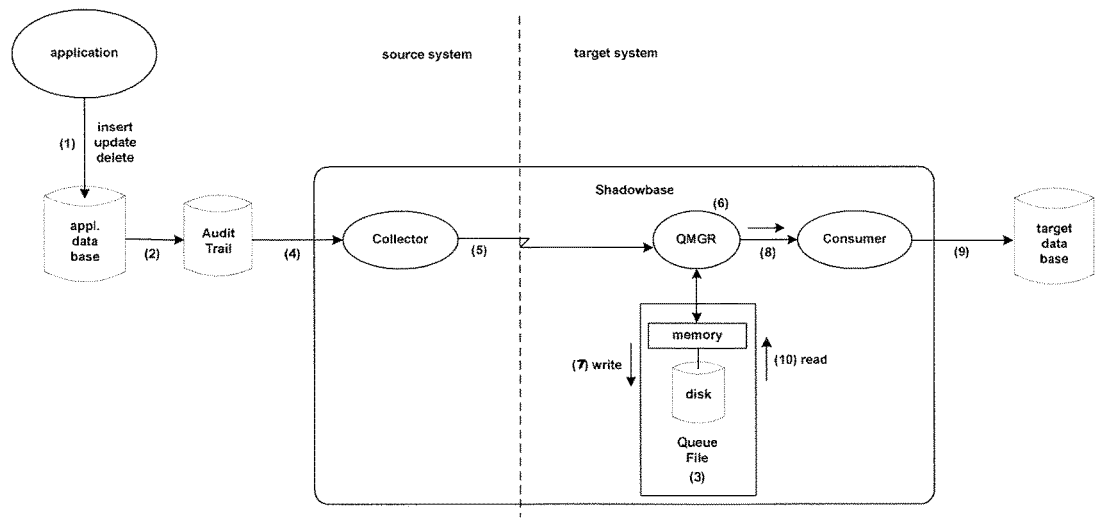
Figure 7: Prior Art - Shadowbase Enhanced Data Replication Engine
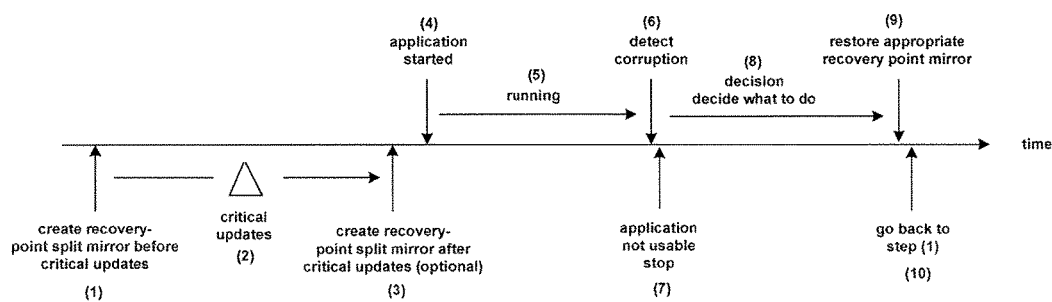
Figure 8: Prior Art - Protecting a Critical Database Update with a Split Mirror

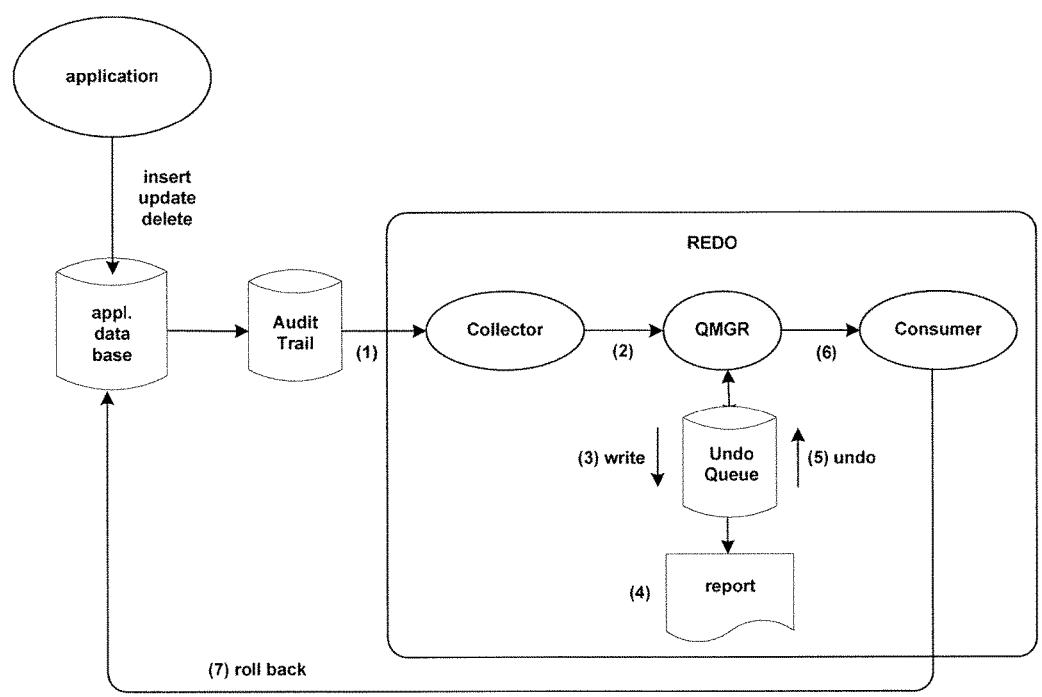
Figure 9: UNDO Database Recovery

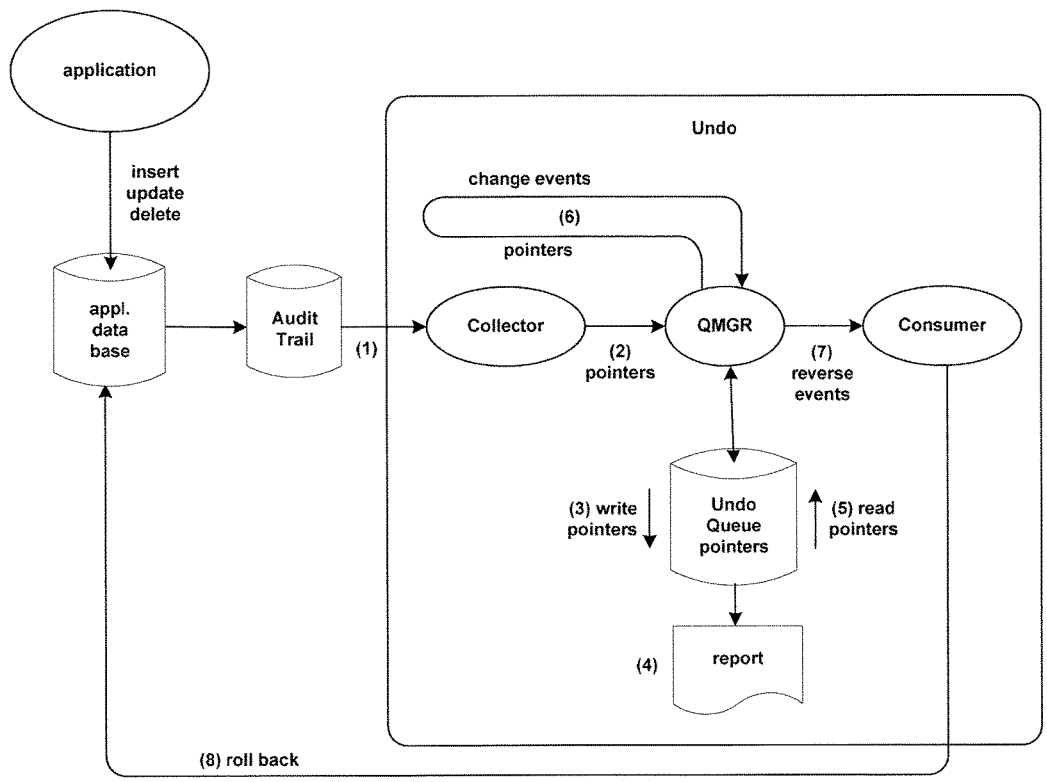
Figure 10: Queuing Pointers to the Change log
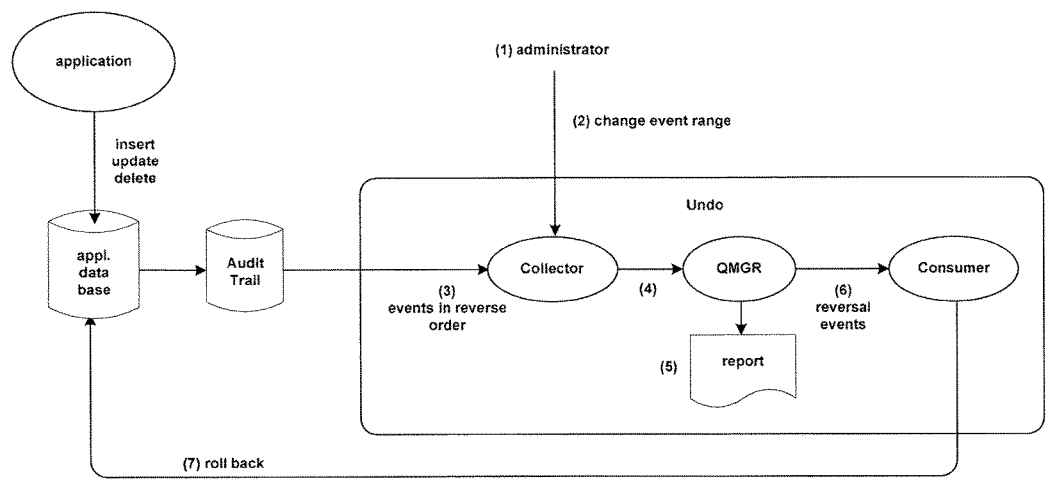
Figure 11: Specifying a Change-Event Range

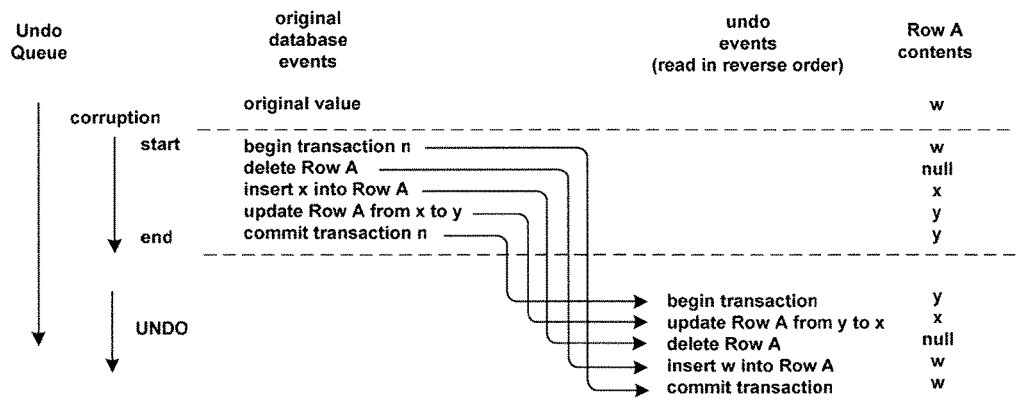
Figure 12: Example of Database Restore Using UNDO
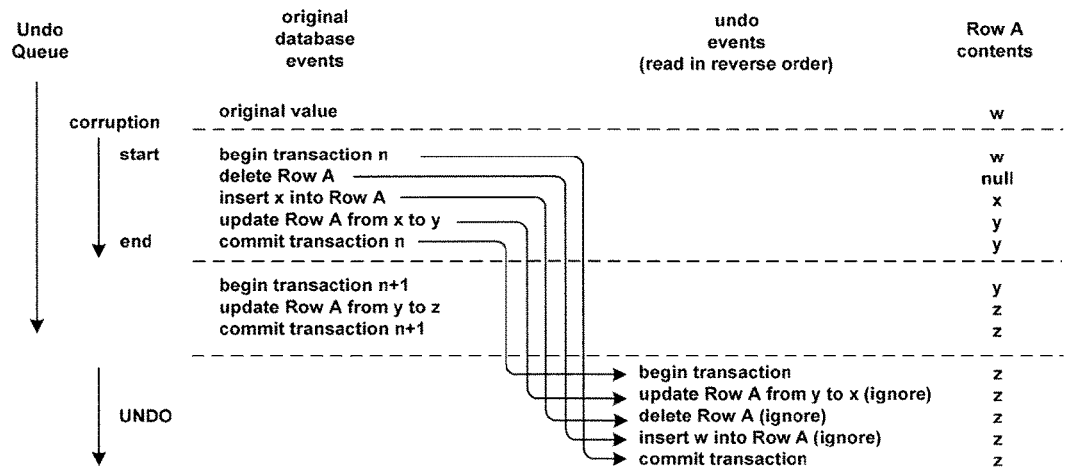
Figure 13: UNDO Handling of Subsequent Changes

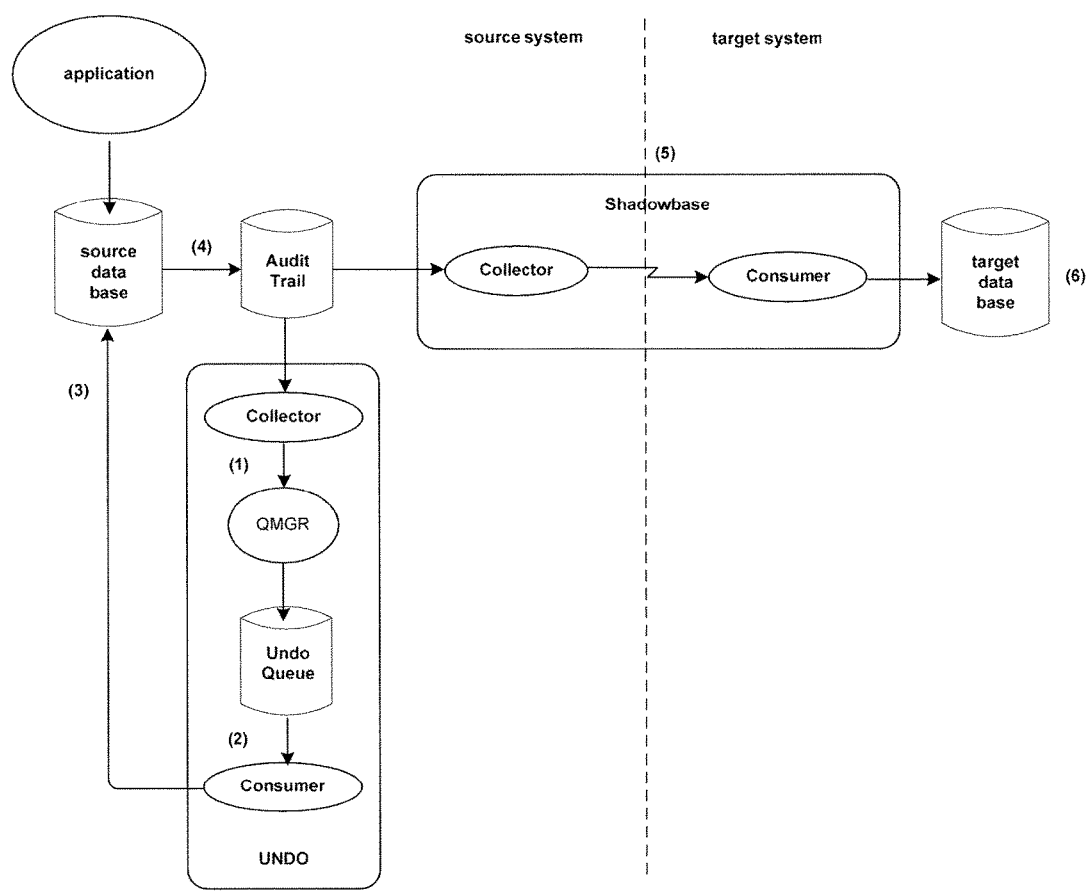
Figure 14: Undoing Replicated Corruption

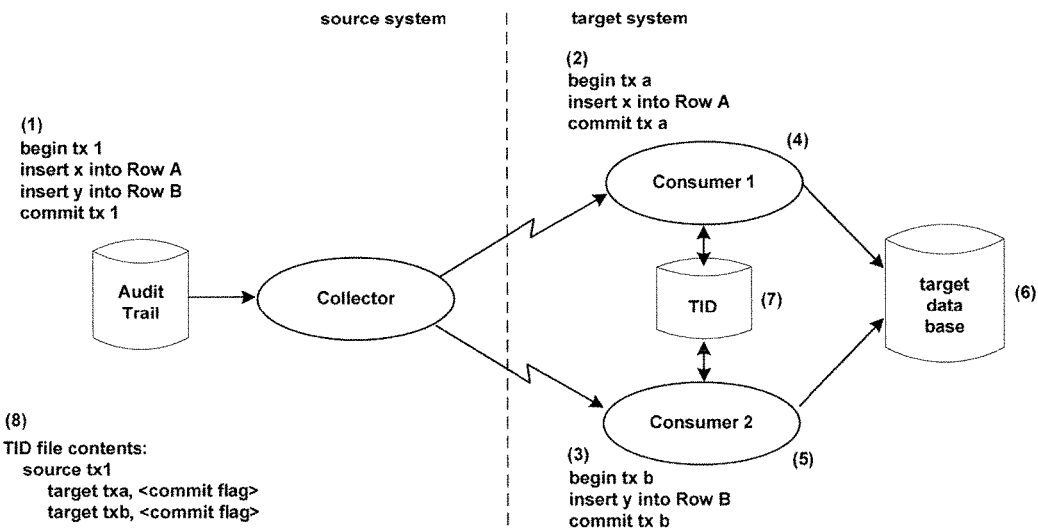
Figure 15: A Split Transaction
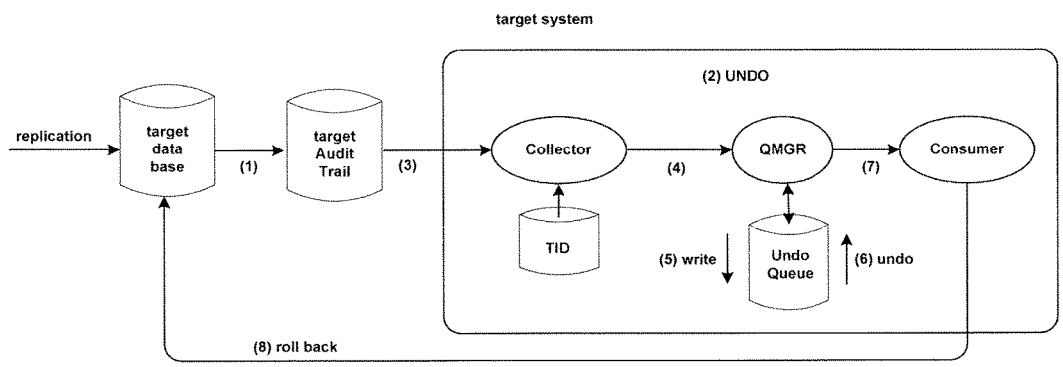
Figure 16: Undoing Target Database Corruption

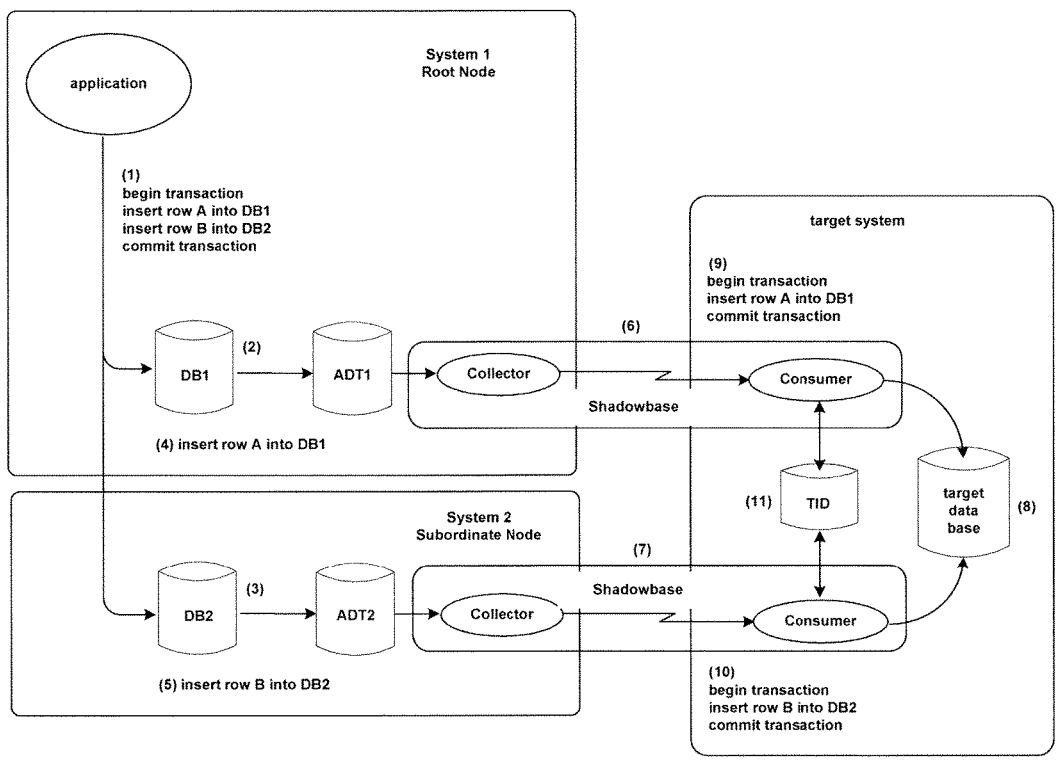
Figure 17: A Distributed Transaction

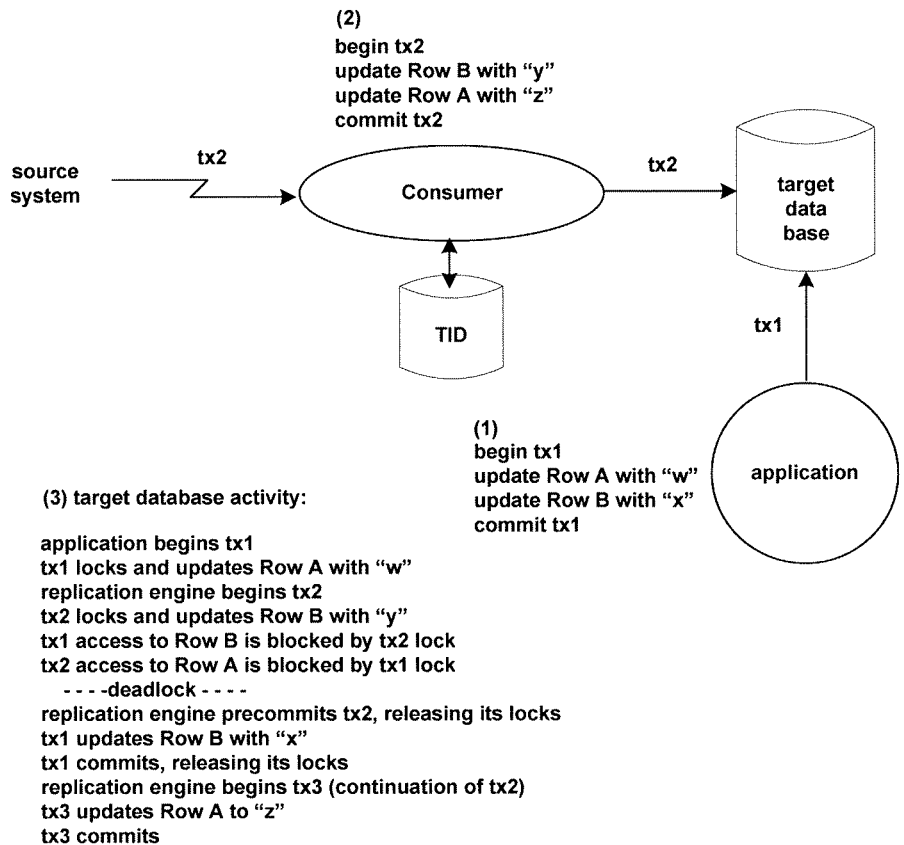
Figure 18: A Precommitted Transaction
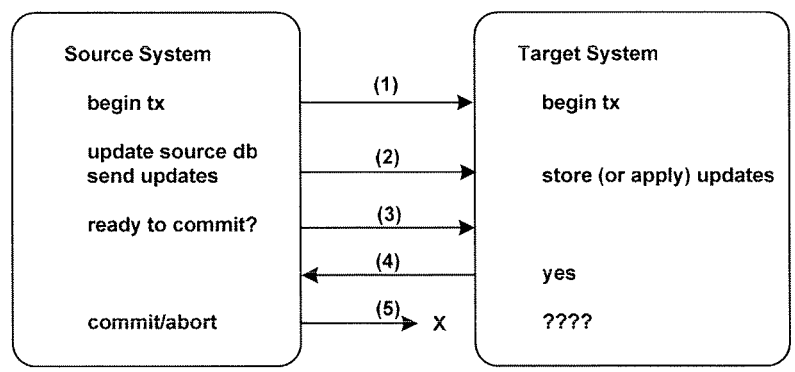
Figure 19: A Hung Transaction

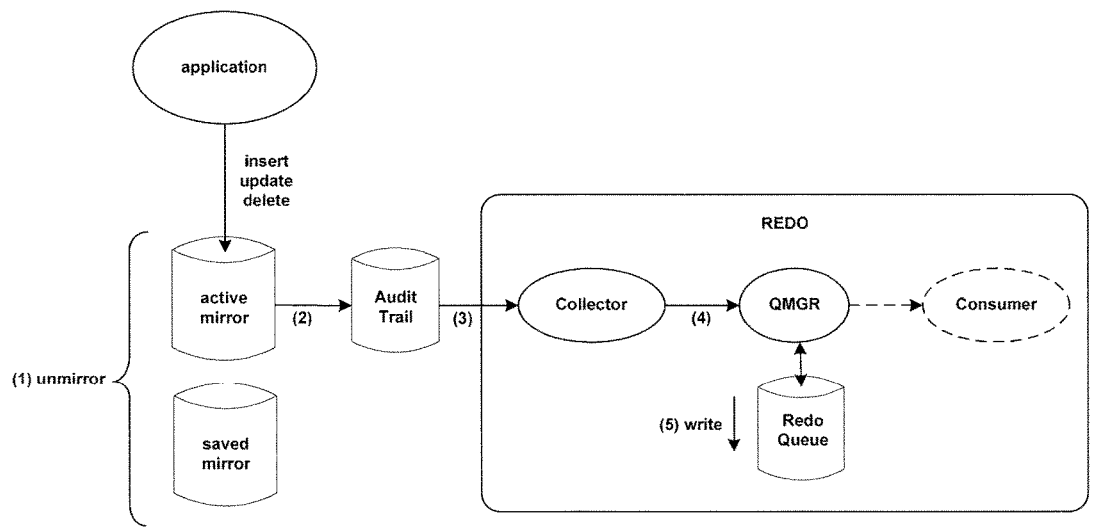
Figure 20: REDO Database Recovery – Passive Monitoring During Upgrade Operations
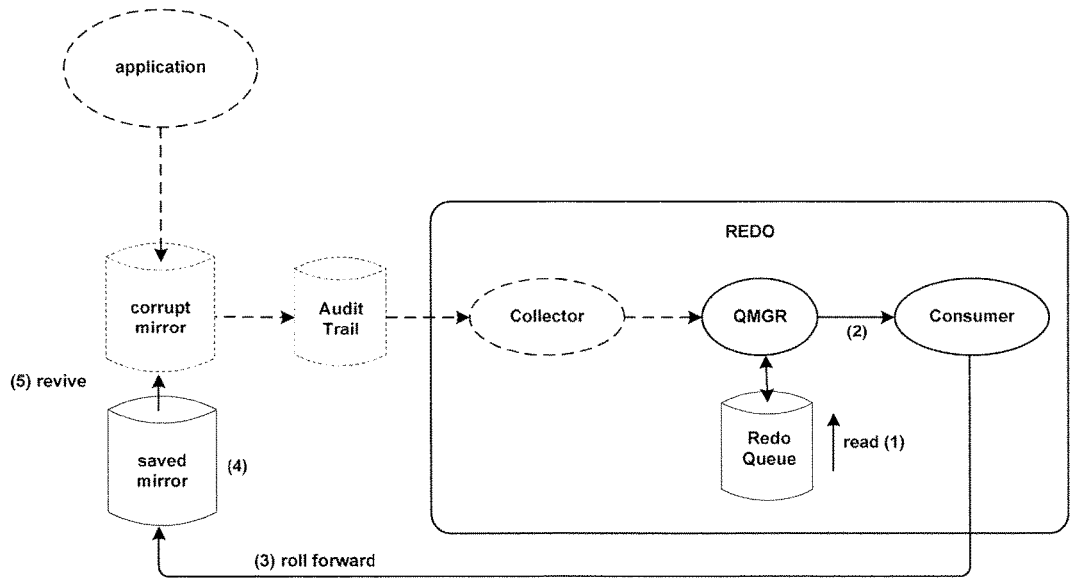
Figure 21: REDO Database Recovery – Restoring the Saved Mirror

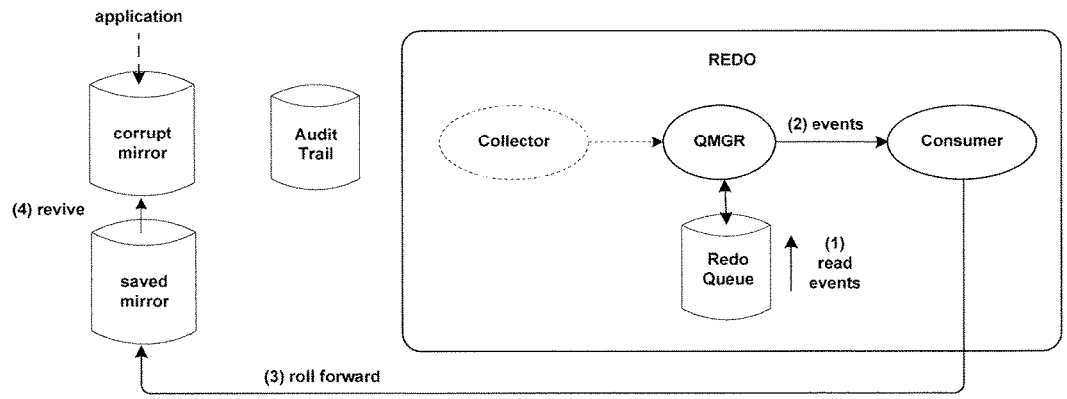
Figure 22: REDO Configuration Options – Queued Events
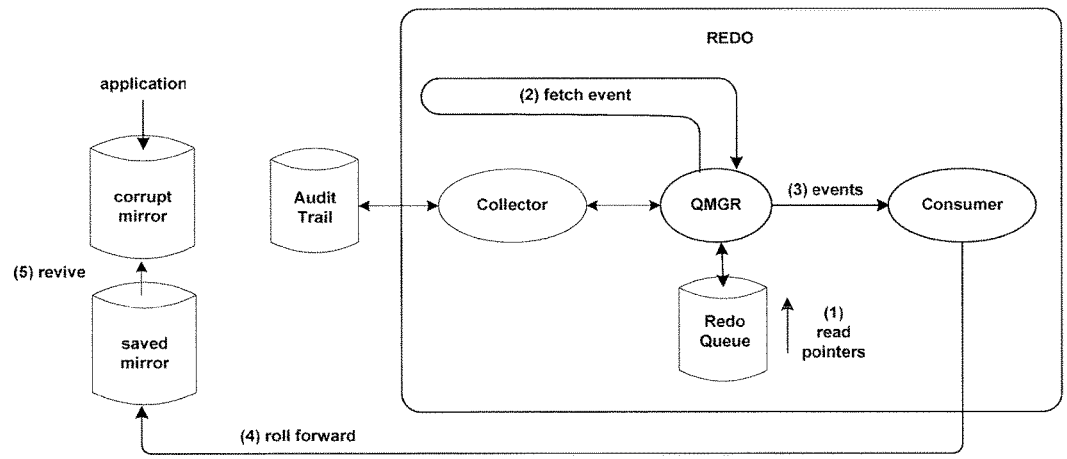
Figure 23: REDO Configuration Options – Queued Pointers

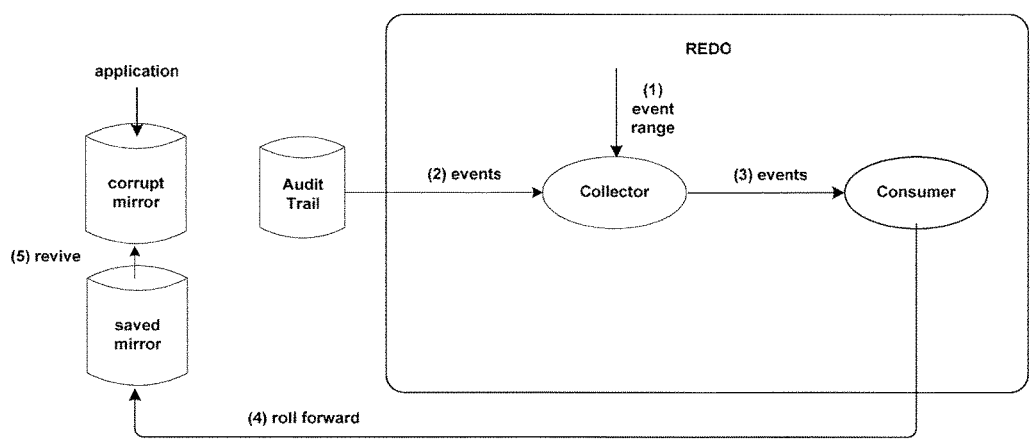
Figure 24: REDO Configuration Options - Event Range

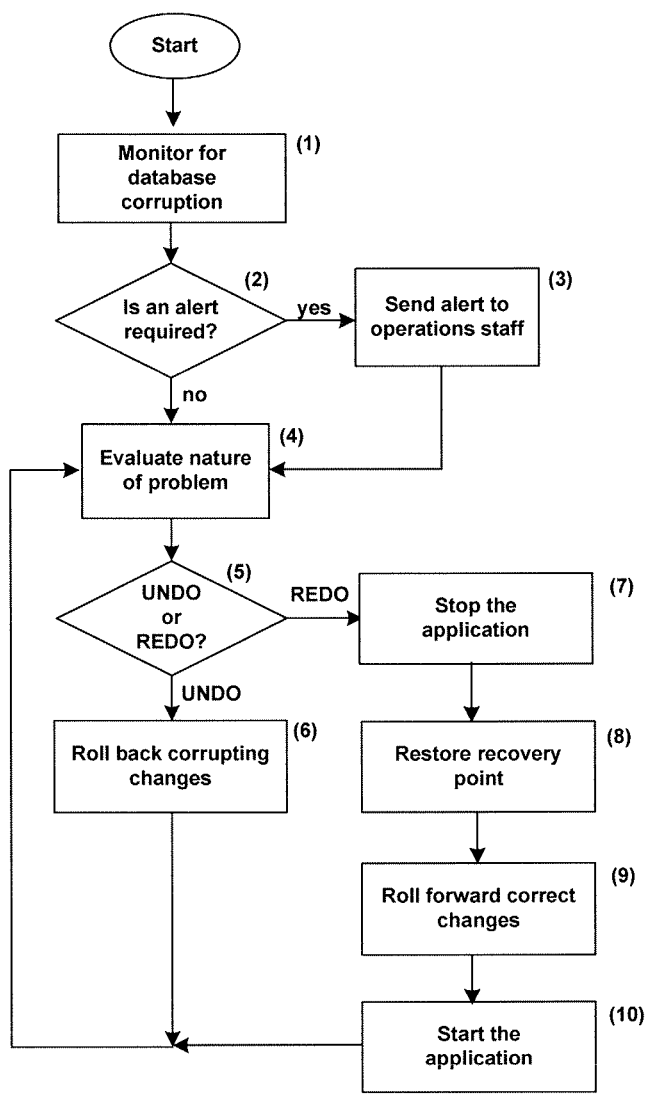
Figure 25: Automating Corruption Detection and Recovery Decision Logic

US 9,830,223 B1

METHODS FOR REPAIRING A CORRUPTED DATABASE TO A NEW, CORRECT STATE

CROSS-REFERENCE TO RELATED APPLICATIONS

This application is related to U.S. application Ser. No. 14/199,546 filed Mar. 6, 2014, now U.S. Pat. No. 8,909,604, which claims priority to U.S. Provisional Patent Application No. 61/773,331 filed Mar. 6, 2013.

This application is also related to U.S. application Ser. No. 14/199,534 filed Mar. 6, 2014, now U.S. Pat. No. 8,903,779, which also claims priority to U.S. Provisional Patent Application No. 61/773,331 filed Mar. 6, 2013.

This application is also related to copending U.S. application Ser. No. 14/605,004 filed Jan. 26, 2015 entitled "METHODS FOR REPAIRING A CORRUPTED DATABASE TO A NEW, CORRECT STATE BY SELECTIVELY USING REDO AND UNDO OPERATIONS".

BACKGROUND OF THE INVENTION

It is possible for an application program, a user, a system operator, or some other entity to apply erroneous operations to a database, thus corrupting it. Once corrupted, the database is useless to applications since the data stored in the database that is used by the applications to make decisions and to provide services cannot be trusted. Means must be provided to return the database to a prior or current correct state so that application processing can continue.

A. Computer Applications

Data-processing applications form the basis for much of our daily activity, from business to entertainment. Most applications are implemented as programs running in a computer. In many cases, an application depends upon a database of information that the application maintains to record the current state of the application. Typically, the information in the database is fundamental to the operation of the application, to the decisions it makes, and to its delivery of services to the end users.

The application's end users may include people, other applications, devices, and other systems. In this specification, the term "end users" means any entities that can influence an application and/or can use the services that it provides.

The fundamental components of an application are shown in FIG. 1. The application comprises a database and a program that is running in a computer. The database may be stored in persistent storage such as a disk for durability, it may be stored in high-speed memory for performance, or it may use a combination of these storage techniques. The database may be resident in the same computer as the application program, it may be resident in another computer, it may be implemented as an independent system, or it may be distributed among many systems.

A database generally includes several files or tables, though it may be just a random collection of unorganized data. Each file or table typically represents an entity set such as "employees" or "credit cards."

With reference to FIG. 1, the application receives inputs from certain end users (1). It processes these inputs and may make certain modifications to its database as a result (2). Database modifications are made via DML and DDL commands. DML commands modify the contents of the database. Examples of DML commands are insert a row, update a row (modify its contents), and delete a row. DDL commands typically modify the structure of the database. Examples of DDL commands include insert or delete a table and insert or delete a column in an existing table.

The application can read the contents of rows in its database (3). As part of its processing of an incoming event, it may read certain information from its database to make decisions. Based on the inputs it receives from its end users and the data in its database, the application delivers certain services to its end users (4). A service may be delivered as the result of a specific input from an end user, such as providing an account balance in response to an online banking query. Alternatively, a service may be delivered spontaneously by the application program, such as on a timed basis or when certain conditions occur. For instance, an alarm may be generated to operations staff if the load being carried by an electric-power transmission line exceeds a specified threshold.

The end users providing the input to the application may or may not be the same end users as those that receive its services.

B. Database Corruption

Erroneous information in the database can wreak havoc on the recipients of the application's services. Credit cards cancelled in error prevent cardholders from making purchases. Incorrect banking account balances can cause unintended overdrafts or credit denials. Erroneous medical records can cause improper treatment of patients and, in extreme cases, even death. Degradation of services range from severe disruptions such as these to the mundane, such as providing a theatergoer with the wrong times for a movie.

Errors can be introduced into a database from several sources, including a faulty application, a user error, the faulty action of a system administrator, a hardware fault, or even employee malfeasance. Some real-life examples of database corruption follow:

1. A large payments processor of credit cards and debit cards receives lists of cards (card account numbers) to be deactivated from banks that issue the payment cards (the issuing banks). These are cards that have been lost, canceled, stolen, or that have suffered fraudulent transactions. On at least one occasion, an issuing bank sent the wrong card file to the payments processor. The file contained all of the bank's payment cards, including both the good cards as well as those to be deactivated. The payments processor processed the file and deactivated every active card that had been issued by the bank. The payments processor had to roll back all of the card deactivations.

2. An application programming error by PayPal prevented eBay merchants from fulfilling orders ("PayPal Services Downgrade with Upgrade," *Availability Digest*; June 2008). Orders were accepted from eBay customers and were entered into the database as legitimate orders, but they were not applied to the database tables for the merchants. Therefore, the merchants did not know about the orders. Customers paid for their purchases through PayPal but never received their goods. It took almost two weeks for PayPal to resolve the problem and to bring its database into a correct state so that it could properly process new orders. It had to roll back the customer orders, and it then had to reprocess and roll forward correct orders that updated both the Customer and the Merchant databases.

3. A major newspaper in the U.S. Midwest maintains a database of all of its reporters and the stories that they had written. One of the reporters was a Pulitzer Prize reporter whose major study was to be published in the next issue of the paper. Either by accident or by employee malfeasance, the reporter and all of his stories were deleted from the database. The newspaper had to recover his entries from magnetic tape backups and roll them forward into the database.

4. The $38 billion Alaska Permanent Fund database set up to distribute oil revenues to the citizens of Alaska was inadvertently deleted by a maintenance technician in July, 2006 ("The Alaska Permanent Fund and the $38 Billion Keystroke," *Availability Digest*; April 2007). Unfortunately, the magnetic-tape backup copies of the database intended to correct such an error were unreadable. It took 70 people working days, nights, and weekends for two months to recreate the database.

5. In December, 2008, the IT manager of JournalSpace, a company providing a popular blogging web site, was discharged for embezzlement. Before leaving the premises, the manager deleted the web site's entire database, which included the blogs of thousands of users ("Help!My Data Center is Down: Part 6—The Human Factor," *Availability Digest*; March 2012). Unknown to company management, the IT manager had elected not to maintain a backup copy of the bloggers' database. The company was unable to reconstruct the database and went out of business.

These are examples of major disruptions of application services caused by database corruption. However, less catastrophic database corruptions occur every day; and the databases must be restored to a correct state as quickly and as economically as possible.

C. Early Prior Art Recovery Methods

Several prior art database recovery methods have been and are being used.

i. Magnetic-Tape Backups

The classic backup method for databases since the early days of computing has been and still is the use of magnetic tapes to maintain a backup database copy that can be used to restore a damaged or lost database. Database backup copies are made daily or according to some other preset schedule.

If a database has to be restored, the magnetic tapes first have to be retrieved from storage, which is typically offsite so as to be protected from a data-center disaster. The magnetic-tape backup copies are then used to reconstruct the database. This process can take hours or days. Sometimes, it cannot be completed if one of the many backup tapes is unreadable. Even if the database restoration is successful, all of the data updates since the last backup are lost and have to be recreated through some other means, such as reentering them manually from hard-copy reports.

ii. Virtual-Tape Backups

Virtual tape has improved this process. Rather than writing the database backup to magnetic tape, tape images are instead written to disk. The disk storage may be located offsite to protect it from a data-center disaster. Because writing to disk is much faster and less manually intensive than writing to magnetic tape, backups can be made more frequently. It is typical to make virtual-tape backups every few hours rather than daily.

If a database must be restored from virtual tape, there is no delay such as that experienced when magnetic tapes are retrieved. Furthermore, the reliability problems with reading magnetic tapes are eliminated. Reading tape images from disk is much faster than it is from physical tape; so database reconstruction is much faster, often measured in hours rather than in days. However, all data updates since the last backup are still lost. This can be hours of data.

iii. Change Logs

Modern-day systems often maintain an independent log of all changes made to a database. The change log is usually resident on persistent storage such as disk so that it will survive a system failure. An important class of change logs is the transaction log.

The transaction log came with the advent of transaction processing. A transaction is a group of database operations that are either all made or that none are made. Modern-day transaction-processing systems use transaction managers that record every transaction in a transaction log to ensure the durability of transactions.

If there is no transaction manager, a change log may be created, for example, by the application, it may be built by an intercept library bound into an application, or it might be fed via triggers in the database that send database changes to the change log.

The change log can be used to recover transactions that are lost following the recovery of a database from a magnetic-tape or virtual-tape backup. Provided that the change log is still available (that is, it has not been lost due a system failure or deleted because it has passed its retention time), the transactions that have occurred since the last backup can be replayed from the change log against the restored database.

However, if the recovery of the database is due to the database being corrupted, the replay of transactions can only be made up to the point of corruption. Further replay will simply re-corrupt the database. Prior art methods of replay will bring the database to its correct state just before the corruption began. All changes made after the database corruption began will be lost.

There are other forms of the change log, for example, a log of all database changes made to a nontransactional database. In this case, the change log does not typically have transactional events such as begin work and commit work in it; in essence, each individual change event can be considered to be a committed event. The change log may be maintained by the database management system (DBMS), directly by the application, by an intercept library bound into the application, by database triggers, or by some other DBMS entity. Regardless, the changes contained in the change log can be used to restore a corrupted database up to the point of corruption using the methods described above.

iv. Mirrored Backups

For applications that are critical to a company, the integrity of the database is paramount. In many cases, these applications run on fault-tolerant systems. HP NonStop servers are an example of such systems. They are designed so that they recover instantly from any single hardware or software fault and often from multiple independent faults.

In systems such as HP NonStop servers, the databases are often mirrored. Two independent disks are configured for every database disk in the system. The application database is resident on both disks, and any change made by the application to the database is made simultaneously to both disks. Therefore, if one disk should fail, its mirrored copy is used to continue processing. When the failed disk is repaired, it is revived. That is, the contents of the good disk are copied to the recovered mirror; and the mirrored pair is then returned to service. The application typically can continue to run during the revive process.

Advantage can be taken of the mirrored pair if an application change that could potentially damage the database is attempted. To do this, the disk subsystem is unmirrored, leaving one copy of the mirrored pair offline and the other copy online supporting the application. The new application then can be run. If it should prove to be faulty and corrupts the database, the application's use can be terminated. The contents of the offline mirror are mounted to replace the corrupted disk or copied to the corrupted disk, and the system is returned to operation with the database recovered to the earlier unmirroring point, yet as a fully mirrored database. Since the previous good version of the application can be restarted and be running during the remirroring operation, this technique provides very fast recovery of the corrupted database.

Unfortunately, all changes made to the database during the trial operation of the new application are lost. The change log is generally unusable with an earlier version of the database and cannot be used to roll forward the changes since the unmirroring.

v. Data Replication

The introduction of data replication has minimized data-loss problems when certain types of failures occur. With data replication, changes to a production database are immediately transmitted to a target database as they occur on the production system. The target database is typically on a remote data-processing system that can run the application should the production system fail. Implemented properly, the remote system with its replicated database can take over the failed application functions in times measured anywhere from seconds to hours.

If a failure occurs at the source system, and if asynchronous data replication is used, in which a data change is sent to the target system after it has been applied to the production database, the amount of data lost is the data still in the replication pipeline. That data has not made it to the target system (W. H. Highleyman, P. J. Holenstein, B. D. Holenstein, Chapter 3, Asynchronous Replication, *Breaking the Availability Barrier: Survivable Systems for Enterprise Computing*, AuthorHouse; 2004). Data loss can be reduced to seconds or less with asynchronous data replication.

By using synchronous data replication, in which a data change is not made permanently to the production system until the target system has confirmed that it has safe-stored (or applied) the data change, a failure at the source system will result in no data being lost (W. H. Highleyman, P. J. Holenstein, B. D. Holenstein, Chapter 4, Synchronous Replication, *Breaking the Availability Barrier: Survivable Systems for Enterprise Computing, AuthorHouse;* 2004).

If both the production system and the target system are configured as an active/active configuration such that each is running the application, the two databases are kept in synchronization via bidirectional data replication. If a change is made to the database by either system, that change is replicated to the other system. Thus, a transaction can be sent to either system and can be properly processed (B. D. Holenstein, W. H. Highleyman, P. J. Holenstein, Chapter 3, An Active/Active Primer, *Breaking the Availability Barrier II: Achieving Century Uptimes with Active/Active Systems*, AuthorHouse; 2007). If one system fails, all that is required to continue full processing is to reroute transactions destined for the failed system to the surviving system. Thus, recovery from a system failure can be accomplished in seconds or less.

However, data replication does not solve the database-corruption problem. Usually, if a problem such as an application error, user error, or operations-staff error has corrupted the source database, the errors will be replicated to the target database so that it also becomes corrupted.

D. Recent Prior Art Recovery Techniques

Historically, prior art recovery of a corrupted database required a previous backup copy be taken with the application offline (or in read-only mode); and the recovery operation consisted of stopping all application processing and restoring the database from the backup copy. Over time, enhancements were made to this general approach, allowing the application to remain active for updating while the backup was taken or the recovery was performed. However, any database changes made since the backup was taken were typically lost. Additional improvements were made to address this data-loss issue, such that changes made to the database since the backup was taken were reapplied against the restored copy to "roll forward" the database to a particular point-in-time. This was usually accomplished by reading the change log for changes made since the backup was taken and reapplying the changes contained in it in ascending order. For example, this approach is common in the HP NonStop TMF environment to recover a lost or corrupted file.

The recovery of corrupted databases in many subsequent prior art methods has depended upon the availability of a log of all changes made to a database. By using this log, updates in error can be backed out and replaced with correct values.

In many application implementations, a current log of all updates made to a database is maintained in a change log of some sort, as shown in FIG. 2. When a modification to the database is made, such as inserting, updating, or deleting a row, that change is made not only to the database (1) but is also recorded in a change log (2). In some instances, the change log is created by the application. In others, it is created by database triggers that are activated whenever a change is made to the database. Often, the change log is created by a transaction manager, as described next.

Many modern-day data-processing applications are typically transaction-oriented. A transaction is a set of database changes that are treated as an atomic entity—either all changes within a transaction are applied to the database, or none are (Jim Gray, Andreas Reuter, page 6, *Transaction Processing: Concepts and Techniques*, Morgan Kaufmann; 1993). A transaction sequence is typically bounded or delimited by an initiating begin-transaction command (which may be implicit in the first update of a transaction) and a terminating commit or abort command. A commit command indicates to the database that the transaction should be applied to the database. An abort command indicates that the transaction should be ignored.

A transaction manager that controls the applying of transactions to the database is responsible for the durability of those transactions should a system failure occur. To fulfill this responsibility, the transaction manager typically maintains a durable change log in persistent storage such as disk. This is the change log referenced above. Examples of such change logs are the Audit Trails used by HP Nonstop systems for their Enscribe, SQL/MP, and SQL/MX databases and the Redo Logs for Oracle databases.

E. Recent Prior Art Recovery Techniques for Rollback Database Recovery

Prior art implementations for roll-back database recovery use the change log as an important component of database recovery. These implementations include, as examples, Oracle Flashback, Oracle GoldenGate Reverse, and the Gravic Shadowbase data replication engine.

i. Oracle Flashback

Oracle Flashback is a facility provided by the Oracle database manager to restore a database to a known point in time [Section 5.1, "Restore Points and Flashback Database: Concepts," *Oracle Database Backup and Recovery Basics,* 10 g *Release* 2 (10.2), *Part Number B*14192-03]. The Flashback architecture is shown in FIG. 3.

Oracle normally maintains a Redo Log (1) of all changes to the database. For each change, the Redo Log includes an entry describing the effects of the change on the database. Oracle enters into its Redo Log the before image of any data block that has been deleted, the after image of any data block that has been inserted, and both the before and after images of a data block that has been updated.

If Flashback is enabled, Oracle also maintains a Flashback Log (2). The system administrator enters a flashback retention target, which is the earliest time to which Flashback must be able to restore the system. From that time on, Oracle will enter into its Flashback Log the before image of any data block that has been changed.

To return the database to a specific point in time, the administrator will enter a restore time. Flashback will follow the Flashback Log from the restore time forward. When it finds the first entry for a data block, it will restore the data block's image in the database to the before image contained in that Flashback entry (3). It will then ignore any further before images for that block. When Flashback has finished passing through its Flashback Log, it has returned all of the modified data blocks in the database to their states at or before the restore time.

Flashback also provides a facility for restoring the database to a known point in time prior to a risky event. This is useful, for instance, to protect the database from maintenance functions that may corrupt the database or from the trial of a new version of an application. To use this feature, the system administrator establishes a normal restore point by specifying either a restore time or an Oracle transaction-identification number (the SCN, or system change number) to which the database is to be restored if there is a problem. In this case, Oracle also will create a Flashback Log; but the Log will contain only the first change to a data block. Changes after the first change to a data block are not entered into the Flashback Log.

If a problem requires the database to be returned to its state at the normal restore point, the Flashback facility reads and applies all of the before images in its Flashback Log. When Flashback has completed this, the database has been restored to its beginning state.

If desired, once a database has been returned to a valid and correct state, Oracle can use the contents of the Redo Log to replay (or roll forward) the transactions contained in it against the database to bring it to the desired state (4).

ii. Oracle GoldenGate Reverse

The GoldenGate Reverse utility uses before images to undo database changes for specified tables, rows, and time periods. [Chapter 19, "Undoing data changes with the Reverse utility," *Oracle GoldenGate Windows and Linux Administrator's Guide,* 11 g *Release* 2 *Patch Set* 1 (11.2.1.0.1), *E29397-*1]. It enables the system administrator to perform a backout for selected files or tables, unlike other methods that require restoring the entire database.

The system administrator can use the Reverse utility for the following purposes:
1. To restore a test database to its original state after a test is run. Because the Reverse utility only backs out changes, a test database can be restored in a matter of minutes and much more efficiently than a complete database restore, which can take hours.
2. To reverse errors caused by corrupt data or accidental deletions. For example, if an UPDATE or DELETE command is issued without a WHERE clause when one should have been supplied, the Reverse utility reverses the operation.

To use the Reverse utility, the following operations are performed (FIG. 4):
1. Run the Extract utility to extract the corrupted data (1). The input to the Extract utility is a "data source," which is either the source database itself or a trail of changes made to the source database. The user adjusts the starting and ending time of the Extract utility parameters to position into the data source to extract the changes to be reversed. The output of the Extract utility is a disk file (called the "Input File") of the changes that are to be reversed, listed in the original order in which they occurred.
2. Run the Reverse utility to perform the reversal of transactions (2). The input to the Reverse utility is the output of the Extract utility. The Reverse utility reads the Input File and physically reverses the events in it, converting transaction and database change events as described below. The output of the Reverse utility is a file (called the "Output File") of the reversing events in time-reversed order. The Output File is organized such that the Replicat utility can read the Output File in ascending order to apply the events in it against the database to reverse the original database changes.
3. Run the Replicat utility to apply the restored data to the source database (3).

Note that this approach requires several processing passes to produce the database changes to be reversed, requires two additional file-based copies of the changes to be reversed (beyond the original set of database changes), and requires several writes and reads from interim database files to perform the ultimate reversing operations.

More specifically, it has to start a process (the Extract Process), position into the data source, perform the extract of selected events, read the extracted events, and write them into the Input File. It then has to start another process (the Reverse Process) to position into the Input File, perform an extract, read the selected events, compute the reversal events, and write the reversal events into the Output File in reverse time order. It then has to start another process (the Replicat Process) to position into the Output File, perform an extract and read, and write (apply) the reversal events against the data source (or target database).

The Reverse approach produces several interim copies of the events to be reversed. More specifically, with the Reverse approach, the database changes to be reversed exist initially in the data source; Extract creates an interim copy and stores it in the Input File (in the original event order); Reverse creates another copy and stores it in the Output File (modified for the reversal operation and stored in reverse order to the original database change order). Hence, three copies of the database changes to be reversed are needed—the original set of changes to be reversed contained in the data source along with two additional copies that Reverse creates. For active data sources with many changes, these copies also will be large files.

The Reverse utility reverses the forward operations by:
1. Reversing the ordering of database operations in an extract file, a series of extract files, or a trail so that they can be processed in reverse order. This guarantees that records with the same key are properly applied.
2. Changing delete operations to inserts.
3. Changing inserts to deletes.
4. Interchanging before images and after images in updates.
5. Reversing the begin and end transaction indicators.

iii. Gravic Shadowbase Data Replication Engine

The Shadowbase data replication engine from Gravic, Inc., of Malvern, Pa., also can be configured to provide database recovery. The Shadowbase data replication engine is shown in FIG. 5. In HP NonStop systems, the Shadowbase replication engine uses the NonStop TMF Audit Trail as the change log (1). A Shadowbase Collector on the source system (2) follows the Audit Trail and sends database changes to a Shadowbase Consumer on the target system (3). The Consumer applies the database changes to the target database (4).

The application of random changes to a database is a lengthy process. Therefore, it is typically the Consumer that limits the replication capacity of the Shadowbase replication engine. To alleviate this problem and improve the overall replication-processing throughput, the Shadowbase replication engine can be configured with one or more Consumers driven by one or more Collectors communicating over one or more communication channels (W. H. Highleyman, P. J. Holenstein, B. D. Holenstein, Chapter 10, Referential Integrity, *Breaking the Availability Barrier: Survivable Systems for Enterprise Computing*, AuthorHouse; 2004).

When used to recover a corrupted database on a single system that is not in a replication environment, the Shadowbase replication engine is configured on the system hosting the database, as shown in FIG. 6. A special user exit (a "user exit" in a Shadowbase replication engine is a code fragment that is embedded into the replication engine to enhance its normal processing for the events being replicated) is written for the Shadowbase Collector (1), for the Shadowbase Consumer (2) or for both to filter the Audit Trail records (3). Only those records that are necessary and desired for database restoration are retrieved.

The Shadowbase Collector follows the Audit Trail from the point of desired recovery and sends the selected change events to the Consumer. Using the logic of the user exit, either the Collector or the Consumer or both cooperatively look for the first change to a data row. The before image of that change is applied to the application database (4), thus backing out the erroneous contents. No other changes to that specific row will be selected or applied.

More specifically, if the first change event was an insert, the row is deleted; if the first change event was a delete, the row is reinserted; if the first change event was an update, the before image of the update is reapplied. Using this processing, if an insert is being applied, and the row already exists, the insert will be mapped to an update; and the update will be applied. If a delete is being applied, and the row does not exist, the delete event is discarded; and processing continues. If an update is being applied, and the row does not exist, it is mapped into an insert; and the insert is applied. If an update is being applied, and the row already exists, the before image of the update is reapplied, as stated above. Changes to a data row following the first change after the restore time are ignored.

When the Shadowbase replication engine has completed its processing of the Audit Trail, the application database has been restored to its correct state at the designated restore time.

With Shadowbase database recovery, it is unnecessary to reconstruct the entire database. Often, only a portion of the database has been corrupted by an application or by an end user. The system administrator can specify that only changes made by a specific entity or matching certain criteria be rolled forward. For instance, recovery can be limited to those changes made by a particular application or by a particular person or only those changes made to a designated table or range of rows in a designated table. These criteria are then built into the recovery user exits implemented for this purpose.

In the following figures and descriptions, the Shadowbase Collectors and Consumers are depicted without the user exits for graphical simplicity. However, it is understood that the Collectors and Consumers may have user exits embedded into them even if not shown or described.

iv. Gravic Shadowbase Enhanced Data Replication Engine

An enhanced version of the Shadowbase data replication engine can dramatically reduce the amount of data lost following a source-system failure due to data in the replication pipeline failing to make it to the target database. It can also speed up the restoration of a corrupted database.

In the basic Shadowbase data replication engine shown in FIG. 5, data replication is incomplete until the Consumer has applied the database update to the target database. Applying random updates to a database is a lengthy process, whereas reading a sequential file as the Collector does with the Audit Trail is a relatively rapid process.

By adding an additional queuing component, one also can dramatically improve the delivery of the data to the target environment. This is useful as it divorces the delivery of the data from the replaying of the data and allows each to run at its own inherent speed by using intermediary queues to hold the data until it can be replayed. This is particularly useful in business-continuity environments, as it lessens the amount of data loss should a disaster strike the source environment. This architecture is shown in FIG. 7.

It is much faster to write rows sequentially to an intermediary queue (shown as a disk-based "Queue File," although it could be memory-resident) than it is to apply them randomly across the database as the Consumer has to do. This is because the rows can be blocked (or batched), and many rows can be written as a single block (or batch) to the Queue File. Furthermore, if the disk is not used for other purposes, after the write completes there is no need to move the disk head, as the next write will be an append. Therefore, each write is faster because it does not have to wait for the disk head to be repositioned—an operation that is much lengthier than simply having to wait for the disk to rotate to the proper sector for the write.

The enhanced Shadowbase queuing mechanism works as follows. With reference to FIG. 7, the application makes changes to the application database via inserts, updates, and deletes of rows (1). These changes are also recorded in the application's change log [for instance, the NonStop TMF Audit Trail (2)].

A Queue File on the target system (3) temporarily holds changes that have been replicated to the target system. The Queue File comprises a memory buffer into which replicated changes are stored while they await processing by the Consumer. If the memory buffer should fill, it can overflow to a disk file.

The Shadowbase Collector on the source system follows the Audit Trail (4) and sends changes (5) to a Queue Manager (QMGR) (6) on the target system. The QMGR writes the changes into the Queue File on the target system (7) and passes them to the Shadowbase Consumer(s) (8) for applying to the target database (9).

If the Consumer(s) should fall behind the replication stream, rather than holding up replication and increasing the possibility of lost data should the source system fail, changes are held in the Queue File until the Consumers have time to read them from the Queue File (10) and to apply them to the target database. Thus, replication is delayed only by the time to write changes sequentially into a memory buffer rather than the time that is required to apply changes randomly to the target database. Consequently, data loss due to a replication channel failure is greatly reduced.

Recovery of a corrupted database to a prior point-in-time by the enhanced Shadowbase replication engine is similar to that of the basic Shadowbase replication engine shown in FIG. 6 and described in the earlier section entitled "Gravic Shadowbase Data Replication Engine", except that the Queue file is used instead of the Audit Trail for recovery purposes. The recovery of a corrupted target database in a replication environment is enhanced by this configuration. If the target database is on a separate system from the source database, the enhanced Shadowbase replication engine has access to a local copy of the changes on the target system via the Queue File. It does not have to access changes from an Audit Trail on the remote system. Thus, communication time is saved and file restoration proceeds at a faster pace.

Furthermore, a corrupted target database can be restored even if the source system is not available due to a source-system failure or a replication network failure. This is important in the event that the source system fails and the target system must take over application functions with a corrupted database.

F. Recent Prior Art Recovery Techniques for Roll-Forward Database Recovery

The prior art has several ways that are used to restore a corrupted database using a roll-forward approach. One is to make a copy of the database on magnetic tape or disk prior to initiating processing with the upgraded system. If problems occur, the system infrastructure is returned to its configuration before the upgrade. The database is loaded with the copy to restore it to its state prior to the upgrade, and the change log is used to roll forward the subsequent changes that were made during processing by the upgraded system. An example of this implementation is HP's NonStop TMF Transaction Management Facility.

This technique presents some significant challenges. One challenge is the amount of data that needs to be processed to perform the restore operation. Typically, the entire file or table has to be restored to the prior backup (or online dump) point even if only a small amount of the file or table was subsequently changed. This can involve the recovery of massive amounts of data from the backup medium and can require access to hundreds of tapes or disk packs.

Yet another challenge is the time it takes to copy and to restore a large database from magnetic tape or disk. Many application databases today are massive, often measuring several terabytes in size. Even backing up and restoring from high-speed disk rather than from magnetic tape can take hours if not days. During this recovery time, the application is typically down.

Attempting to restore the database using a prior art approach such as the Oracle Flashback capability that recovers to a previous point-in-time from just the change blocks can take a very long time to complete if there has been a lot of update activity against the database since the restore point was taken (see the section entitled "Oracle Flashback"). Worse, the application is often unavailable during the process since the database typically must be taken offline during the operation.

Another problem is that the roll-forward capability provided by many transaction managers does not allow selective roll forward. All of the changes that are in the change log are applied to the database to bring it to a current state. This can result in the transaction manager rolling thru the corrupting changes and reapplying them, causing the newly restored database to also become corrupted. It is also possible that roll forward will be unsuccessful, as many of the database changes made during the aborted processing may have depended upon a new infrastructure and hence cannot be applied to the database copy. If this is the case, the result is that the roll-forward operation is aborted by the transaction manager. It cannot be completed.

The time challenge can be improved in the prior art via another recovery method. For example, in fault-tolerant systems such as HP NonStop servers, the disks are mirrored. Every logical disk actually comprises two disks, and all updates are applied to the two disks (the mirrored pair) simultaneously.

In this case, prior to running the upgraded system, the mirrors are split. One mirror is used by the upgraded application, and the other mirror is saved as a 'fast-recovery' pre-upgrade version of the database. Splitting a mirror and attaching the application to one of the mirrors is a relatively fast operation. A third mirror can be attached to the database and revived as the application runs so that the application is once again running against a mirrored database after the upgrade. This helps protect the upgraded system from subsequent media failure causing a system outage.

Mirrored disks may either be physical disks or logical disks. In many systems, a storage-area network (SAN), such as HP's XP storage disk array, creates logical disks that appear to an application to be an independent physical disk. Using SANs, applications may have any number of mirrored copies of a database without having to purchase additional physical disks.

The technique for using a split mirror for database recovery is illustrated in FIG. 8. If it is anticipated that a critical update may lead to database corruption, the mirrored database disks are unmirrored, and one mirror is saved as a recovery point (1). At this point, the database can be remirrored for protection against a disk media failure. The critical updates are then made (2). If the updates appear to not have caused database corruption, an optional updated mirror may be created as a new recovery point (3). This may either be done by splitting the current mirrored database (and optionally remirroring it), by reviving the current database split mirror (that is, synchronizing it with the updated database), or by creating another mirror, reviving it, and splitting it as a second recovery point.

At this point, the application is started (4). After running for a suitable time (5), if no database corruption is found, the split-mirror recovery point(s) are no longer needed and the disks holding the recovery-point mirrors can be released. However, if corruption is found (6), the application is stopped (7). The source of the corruption is determined, and a decision is made (8) as to whether to revert to the first recovery point or to the second recovery point (if one was taken). If the corruption was caused by the critical updates, the first recovery-point mirrored disk is restored (9). If it instead the corruption was caused by database updates subsequent to the critical updates, the second recovery-point mirrored disk is restored. At this point, the entire process of FIG. 8 is repeated. (10).

Thus, the time to save the initial version of the database and then to restore it to the application in the event of a problem is very small. Databases can be remirrored (revived) while the application is running so that the database copy and restoration activity does not significantly impact application availability.

However, the saved mirror typically cannot be rolled forward because the change log is on the mirror that has been abandoned and is not generally accessible by the transaction manager. Even if the transaction manager could access the change log, the replay of the changes may not be possible because the state of the database may not be what the transaction manager or change log expects. Even if the change log is accessible, the transaction manager typically cannot selectively roll forward the change log changes, and the resulting database will match the corrupted database. Thus, the application database cannot be rolled forward to its current, correct state using this method. The application must reprocess all transactions that it had processed in its previous run.

G. What is Needed

As can be seen from the various discussions of prior art recovery techniques, they have several limitations. What is needed are methods to achieve the following database recovery goals:

1. Roll-forward should be selective. Rather than having to roll forward an entire table or file, only data within that table or file that is correct should be rolled forward. In the prior art, tables and files must typically be rolled forward in their entirety. Additionally, the roll-forward operation should allow the corrupted data to be (optionally) corrected and replayed.
2. Roll-back should be selective. Rather than having to roll back an entire table or file, only data within that table or file that has been corrupted should be rolled back. In the prior art, tables and files must typically be rolled back in their entirety. Additionally, the roll-back operation should allow the corrupted data to be (optionally) corrected and replayed.
3. Roll-forward should be as fast as possible to minimize application downtime. In the prior art, rolling a large database forward could take hours or days; and the application is typically out of service during this time.
4. Roll-back should be as fast as possible to minimize application downtime. In the prior art, rolling back a large database could take hours, and the application is typically out of service during this time.
5. Roll-forward should be able to be performed while the application continues to be active to minimize application downtime. In the prior art, the application typically must be shut down during the roll-forward process.
6. Roll-back should be able to be performed while the application continues to be active to minimize application downtime. In the prior art, the application typically must be shut down during the roll-back process.
7. The operation sequences required for roll-forward and the reversing operation sequences required for roll-back should be able to be created without making multiple disk passes through the change-log data.
8. Transactions should be able to be selectively rolled forward up through the most current transaction, not just up to the point that the database corruption began. Corrupted transactions should either be repaired and replayed or be rejected and not rolled forward.
9. The detection of database corruption should be automated so that corruption can be detected as quickly and as accurately as possible. In the prior art, the fact that the database has become corrupted may not even be detected until an end user notices the problem and calls the IT department's help desk.
10. The decision as to whether to correct a database by rolling it back or by rolling it forward should be automated so that this function can be completed as quickly and as accurately as possible. This is a complex function, and in the prior art the decision is made manually after exhaustive analysis. This analysis could take hours or days.
11. During their respective processing, the roll-back and roll-forward operation should at all times maintain the referential integrity of the database. There should never be a point in the roll-back or roll-forward sequence that leaves the database in an incorrect or inconsistent state. The reversing change that caused the referential integrity violation might be rejected by the database manager, leaving corruption in the database. In the prior art, many techniques for roll-forward and roll-back may violate referential integrity for short periods of time.
12. If a split-mirror recovery point has been taken before a critical update to a database, and the update results in database corruption, it should be possible to roll forward the recovery-point mirror to a correct current state by rolling forward only the correct changes that were made during the update and rejecting corrupting changes. Roll-forward typically requires the existence of a change log from which to obtain changes that have been made since the recovery point. In the prior art, the change log is not available to the recovery point mirror. It is contained on the corrupted mirror which is not accessible to the roll-forward utility. Therefore, the application must rerun all transactions that had been originally processed since the recovery point.
13. In a replication environment, means should be provided to remove corruption from the target database by rolling forward recent changes to a replicated copy of the database, even if the change log on the source system is no longer available due to a source-system failure or a replication network failure. This is particularly important if the target system is a backup system to a source production system, and the target system is called upon to take over processing from a failed source system. In the prior art, the change log is often stored on the source system and is unavailable to the target-system roll-forward utility if the source system is unavailable or if the replication network is down.

BRIEF SUMMARY OF THE INVENTION

The present invention discloses some general methods to return a corrupted database to a known, correct state. One method is referred to herein as UNDO, which rolls back a corrupted database to a known correct state. Another method is referred to as REDO, which rolls forward a corrupted database to a known correct state.

The enhanced Shadowbase data replication engine and HP NonStop servers are used to illustrate the implementation of the UNDO and REDO methods. This is for illustrative purposes only. The invention described herein can be implemented with any data replication engine or with special processes working in conjunction with any application change log.

The Shadowbase enhanced replication engine normally maintains a queue of events received from a source system for its Consumers to apply to the target database. In one embodiment of the invention, the Shadowbase replication engine is used to restore a corrupted database on a system that is not operating in a replication environment. In this case, the Shadowbase replication engine is configured on the system hosting the application with the corrupted database. Rather than feeding a target database on a remote system, the Shadowbase replication engine is used to apply corrective changes to the corrupted application database.

For illustrative purposes only, the description of the implementation of the UNDO method uses the enhanced Shadowbase data replication engine to roll back a corrupted database to a known correct state by generating UNDO operations that can be applied to the application database to undo erroneous changes. During the UNDO process, the application can continue to run and to modify the database. New changes following the corruption sequence can be optionally preserved.

UNDO accesses the corrupting changes from its queue, which is called the Undo Queue in the UNDO configuration. Changes are processed in reverse-time order, and each operation is converted so as to have an opposite effect on the database, thus restoring the original value to the database prior to the corrupting change. Inserts are converted to deletes, deletes are converted to inserts, and updates are reversed. This method is useful, for example, when transactional changes are being undone and when referential integrity checking is enabled for the database. By preserving the consistency of the original transactions, the database remains consistent; and referential integrity is preserved before the undo operation begins for a specific transaction, while the UNDO operation is progressing, as well as after it completes.

UNDO also can be used to correct a corrupted database and its replicated target database copy. Furthermore, there are cases in which corruption can occur at the target database even though the source database is correct. In these cases, UNDO can be used to roll back the target database to a correct and consistent state.

For illustrative purposes only, the description of the implementation of the REDO method uses the enhanced Shadowbase data replication engine to roll forward a database from an earlier correct state to a later known correct state. The REDO method generates redo operations that can be applied to an earlier copy of the application database to roll forward correct changes that were subsequently made. REDO uses essentially the same architecture as UNDO. However, the queue of changes maintained by the Shadowbase replication engine for its Consumers is called the Redo Queue.

Rather than rolling back undesired changes, the changes in the Redo Queue are used to selectively roll forward desired changes (preserving the original selected change ordering) into an earlier (saved) version of the database that is known to be correct. As a result, the database is rolled forward from a previous correct version to ultimately a later correct version.

For instance, the earlier (saved) version of the database may be a backup copy of the database or a disk mirror that was unmirrored from its companion and preserved as a database recovery point (the companion mirror remaining in service can have a new mirror revived to protect against media failure). If a new version of the application is run against the companion mirror and performs improperly, the saved mirror of the original database can be moved into service. REDO will roll forward the desired changes to this copy of the database, thus bringing it into a current and correct state. REDO can accomplish this since it does not depend upon the change log on the corrupted mirror. It uses its own queue of changes to generate the roll-forward operations.

Typically, the application must be paused during the roll-forward process because the database is not up-to-date and cannot accurately support ongoing processing (though in some instances, the application may be able to continue if the use of a stale database is not a problem).

UNDO and REDO can be configured as a permanent part of an application, queuing all database change events as they occur so that the Shadowbase replication engine quickly has access to the corrupted events when needed. Optionally, either can be configured following a database corruption; and the Undo Queue or Redo Queue can be loaded from the change log with database events that surround the corrupted events.

The Shadowbase replication engine can generate useful reports from its Undo Queue or Redo Queue to help a system administrator narrow the restore activity to a particular time or transaction range, to particular files or tables, and to particular sources of corrupting errors.

In a preferred embodiment of the present invention, the change log can take the place of the Undo Queue or Redo Queue. In one alternative of this configuration, the Undo Queue or the Redo Queue may contain only pointers to the changes in the change log. In another alternative configuration, there is no Undo Queue or Redo Queue. Rather, the Shadowbase replication engine is given a range of change events in the change log; and UNDO or REDO will process all change events in that range as described earlier. In this case, there is no need for the Undo Queue or for the Redo Queue. The change-event range can be specified, for example, by a date/time range, change log starting or ending position, or by a range of change-event identifiers. This alternative is useful if all events within a given range are to be processed rather than selected events, or if the Shadowbase user exit facility is employed (often configured by the user) to determine which changes are to be kept, and/or which are to be re-applied, and/or which are to be undone.

Typically, when performing a REDO operation, a preferred embodiment reads the change log from the least recent to the most recent event in the REDO range to facilitate the replaying of the events in time event order. When performing an UNDO operation, a preferred embodiment reads the change log from the most recent to the least recent event in the UNDO range to facilitate reversing and replaying the events in reversed time event order.

BRIEF DESCRIPTION OF THE DRAWINGS

The foregoing summary as well as the following detailed description of preferred embodiments of the invention will be better understood when read in conjunction with the appended drawings.

For the purpose of illustrating the invention, the drawings show presently preferred embodiments. However, the invention is not limited to the precise arrangements and instrumentalities shown. In the drawings:

FIG. 1 shows the prior art organization of a computer application.

FIG. 2 shows the prior art inclusion of a database change log in a computer application.

FIG. 3 shows the prior art configuration of the Oracle Flashback database-recovery facility.

FIG. 4 shows the prior art use of the Oracle GoldenGate Reverse facility for providing database recovery.

FIG. 5 shows the prior art Shadowbase data replication engine.

FIG. 6 shows the prior art use of the Shadowbase data replication engine to provide a database-recovery facility.

FIG. 7 shows the prior art architecture of the enhanced Shadowbase data replication engine.

FIG. 8 shows the prior art procedure for protecting a critical database update with a split mirror.

FIG. 9 shows the use of the enhanced Shadowbase data replication engine to restore a corrupted database via UNDO, in accordance with one preferred embodiment of the present invention.

FIG. 10 shows the Undo Queue containing pointers to the change events in the change log rather than to the change events themselves, in accordance with one preferred embodiment of the present invention.

FIG. 11 shows UNDO being given a range of events to reverse, in accordance with one preferred embodiment of the present invention.

FIG. 12 shows an example of a database restore using UNDO, in accordance with one preferred embodiment of the present invention.

FIG. 13 shows an example of UNDO preserving database changes made subsequent to a database corruption, in accordance with one preferred embodiment of the present invention.

FIG. 14 shows the use of UNDO to restore a target database that has been corrupted by replication from a corrupted source database, in accordance with one preferred embodiment of the present invention.

FIG. 15 shows the effect of a split transaction that can cause target database corruption in the event of a system failure, in accordance with one preferred embodiment of the present invention.

FIG. 16 shows the configuration of UNDO for recovering a corrupted target database when the source database has not been corrupted, in accordance with one preferred embodiment of the present invention.

FIG. 17 shows the effect of a distributed transaction that can cause target database corruption in the event of a system failure, in accordance with one preferred embodiment of the present invention.

FIG. 18 shows the effect of precommitting a transaction that has caused a deadlock with another transaction, exposing the target database to possible corruption in the event of a system failure, in accordance with one preferred embodiment of the present invention.

FIG. 19 shows the cause of a hung transaction, in accordance with one preferred embodiment of the present invention.

FIG. 20 shows REDO monitoring database update events during application processing and storing the updates in its Redo Queue, in accordance with one preferred embodiment of the present invention.

FIG. 21 shows REDO rolling forward updates to a split mirror to bring it to a current and correct state following the corruption of the database, in accordance with one preferred embodiment of the present invention.

FIG. 22 shows REDO configured with a Redo Queue wherein the contents of the Redo Queue are events that have updated the database, in accordance with one preferred embodiment of the present invention.

FIG. 23 shows REDO configured with a Redo Queue wherein the contents of the Redo Queue are pointers to events in the change log that have updated the database, in accordance with one preferred embodiment of the present invention.

FIG. 24 shows REDO configured to read an event range specified by a system administrator from the change log, in accordance with one preferred embodiment of the present invention.

FIG. 25 shows the logic for automating corruption detection and the recovery decision, in accordance with one preferred embodiment of the present invention.

DETAILED DESCRIPTION OF THE INVENTION

Figure 26:
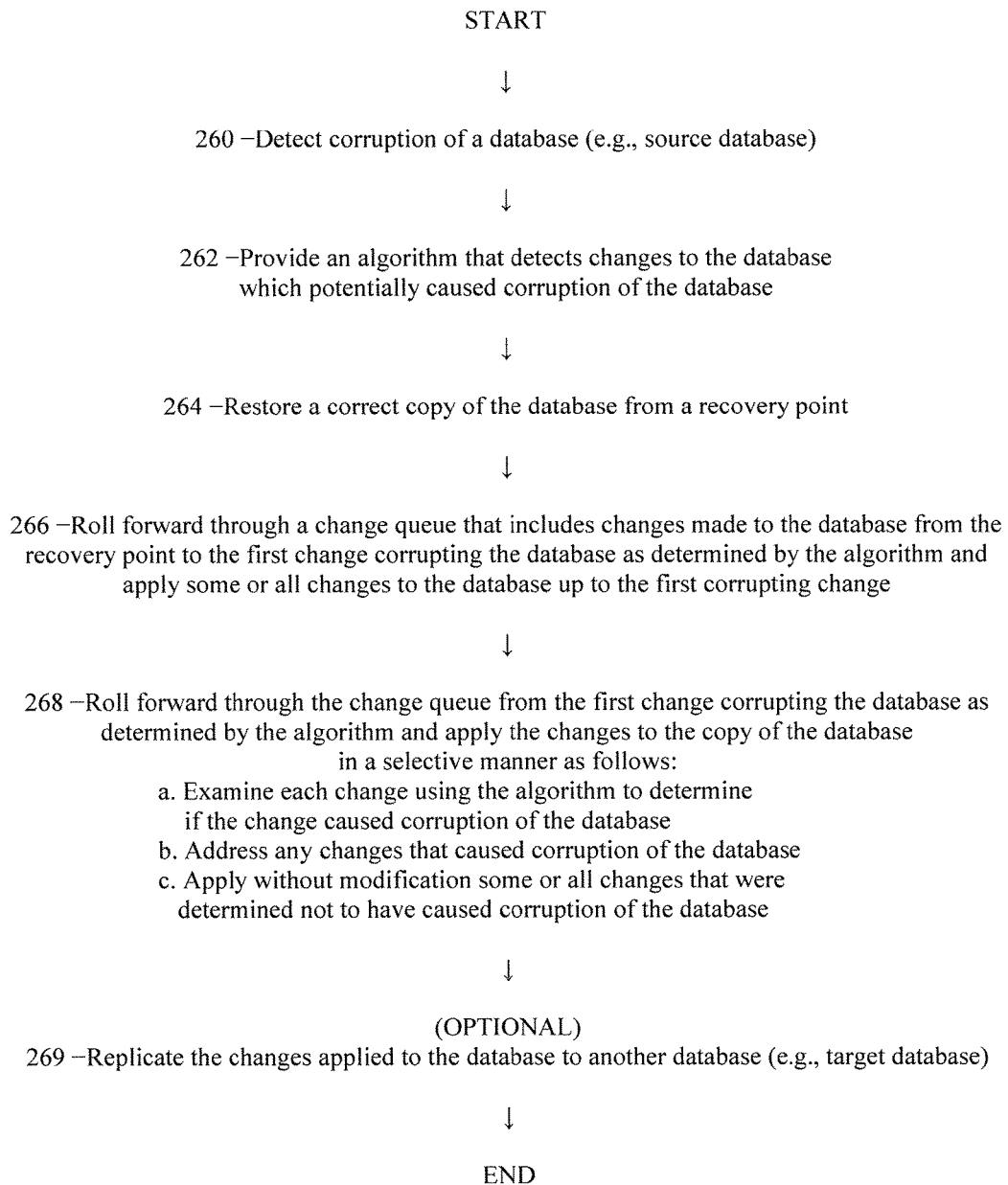
FIG. 26 is a flowchart of a REDO process in accordance with one preferred embodiment of the present invention.

Certain terminology is used in the following description for convenience only and is not limiting. The words "a" and "an", as used in the claims and in the corresponding portions of the specification, mean "at least one."

I. Definitions

The following definitions describe the use of certain terms in this specification and are provided to promote understanding of the present invention. They are hierarchically ordered in that each definition builds on previous definitions.

Program—An executable set of programming code for providing a specific function.

Process—A program running in a computer. One program can be spawned as multiple distinguishable processes.

Table—A set of data values that is organized using a model of horizontal rows and vertical columns. The columns are identified by name, and the rows are uniquely identified by the values appearing in a particular column subset (the table's primary key). A table usually characterizes an entity set. Each row in the table describes an instance of the entity set. Each column describes an attribute of the entity set.

File—The equivalent of a table for nonrelational databases. A file is made up of records, and each record describes an entity instance. A record is made up of fields, each of which describes an attribute of the entity set. In this specification, the term "table" is to be interpreted as "table and/or file."

Column—A table component that holds a single attribute of the entity set, such as SALARY.

Field—A file component that holds a single attribute of the entity set, such as SALARY. In this specification, the term "column" is to be interpreted as "column and/or field."

Row—A table component that represents an entity instance. It is a sequence of {column name, value} pairs usually implemented as a sequence of values positioned according to their corresponding column names. For instance, (EMPLOYEE NUMBER, 235), (NAME, Joe Smith), (DEPARTMENT, Accounting), (SALARY, $30,000).

Record—The same as a row, but "row" is usually used for relational databases; and "record" is usually used for file systems. In this specification, the term "row" is to be interpreted as "row and/or record."

Message—A package of information used to transfer data between processes or applications or other objects (such as queues) in a data processing system. One process creates the message and sends it to another process or object so that action can be taken on the data.

Interprocess Communication (IPC)—An operating-system facility that allows one process to send a message to one or more other processes or objects.

Message Queue—A queue of messages awaiting processing. One or more processes may enter messages into a given message queue, and one or more processes may extract messages or copies of the message(s) from the queue for processing. The same message may be sent to multiple processes via a message queue, or the message may be deleted from the queue as soon as one process extracts it.

Database—A collection of related tables and/or files. Also, the messages resident in one or more message queues.

Data Manipulation Language (DML)—The operations that control the contents of a database, such as insert, update, delete, and read a row or record.

Data Definition Language (DDL)—The operations that control the structure of a database, such as add or delete a column or a table.

Consistency—A database attribute in which any column that is declared a foreign key can contain only values from a parent table's primary key. That is, every child must have a parent.

Correctness—A database attribute that indicates that all data-item values are correct.

Referential Integrity—A database attribute in which the database is consistent, correct, and conforms to all application constraints.

Corruption—Modifications to a database that cause it to violate referential integrity.

Database Management System (DBMS)—Provides facilities for controlling data access, enforcing referential integrity, managing concurrency control, and recovering the database after failures.

Source Database—The current application database.

Source System—The system holding the source database.

Target Database—Optionally, a database to which the source database changes are being replicated.

Target System—Optionally, a system holding the target database (can be the same system as the source system).

Audited Transaction—A delimited set of database operations (e.g., inserts, updates, deletes) that are either all made or none are made. An audited transaction is guaranteed to leave the database in a persistent, consistent, and correct state; and its results are typically guaranteed to survive any system failures.

Unaudited Transaction—A database update or group of updates that is not audited. It has no begin or end indicator. An unaudited transaction is not guaranteed to leave the database in a persistent, consistent, and correct state; and its results are not typically guaranteed to survive system failures.

Transaction—An audited or unaudited transaction.

Before Image—The value of a data item in a database before a database operation is executed against it.

After Image—The value of a data item in a database after a database operation is executed against it.

Mirroring—Two (or more) physical or logical disks configured for every logical disk in the database. The application database is maintained on both disks. As changes are made to the database, both copies of the mirror are updated. Should one mirror disk of the mirrored pair fail, the other disk can continue to support the application.

Revive—Copying the contents of the good disk of a mirrored pair to the recovered disk following a disk failure of a mirrored logical disk.

ACID Properties—Audited transactions maintain the ACID properties of atomicity, consistency, isolation, and durability. Atomicity means that either all operations contained within the transaction are executed against the database or that none are. Consistency means that at any time, the view of the database represents an accurate view of the application data. Isolation means that a transaction is unaffected by other transactions that are executing simultaneously. Durability means that the resulting modification to the database by a transaction will survive any subsequent system failures.

Begin Transaction—A directive that indicates the beginning of an audited transaction. A begin transaction directive may be explicit, or it may be implicit with the first database operation for a transaction. Also referred to as Begin Work.

Commit Transaction—A directive that indicates that an audited transaction has successfully completed and should be made durable. Also referred to as Commit Work.

Abort Transaction—A directive that indicates that an audited transaction has been unsuccessful and should be undone and have no effect on the database. Also referred to as Rollback Work.

Hung Transaction—An audited transaction that does not have a terminating delimiter (e.g., a commit or an abort event). Also referred to as a dangling transaction or an incomplete transaction.

Transaction Manager—A facility for ensuring that audited transactional updates to a database maintain the ACID properties.

Change Log—A sequential list of all changes made to a database. Typically, the list is stored on disk (e.g., in a file), in memory, in a queue structure, or in another form of persistent storage. Also referred to as a Change Queue.

Transaction Log—A list of all changes made to a database by a transaction manager. A transaction log typically holds audited transactions. A transaction log is one example of a change log. In this specification, the term "transaction log" is to be interpreted as "change log." Also referred to as an Audited Transaction Log.

Non-Audited Change Log—A list of all changes made to a database by a database manager, application, or other entity. A non-audited change log typically holds unaudited business transactions or other database change events when an audited transaction manager is not being used by the DBMS (e.g., the database changes are not delimited by begin or commit/abort directives). A non-audited change log is one example of a change log. In this specification, the term "non-audited change log" is to be interpreted as "change log."

Audit Trail—A list of all changes made to a database. An Audit Trail is one example of a transaction log. In this specification, the term "Audit Trail" is to be interpreted as "change log."

Data Replication—The propagation of changes from a source database to a target database (which may be the same as the source database) or application intended to keep the target database or application in synchronization with the source database. Replication is often accomplished at the transaction level.

Bidirectional Data Replication—Replicating data between two databases in both directions. If a change is made to one database, it is replicated to the other database.

Data Replication Engine—A facility for replicating source database changes to a target database or application.

Collector—A data replication engine component that reads database changes from a change log and sends them to the target system over a communication channel. Also called an Extractor.

Consumer—A data replication engine component that receives changes made to a source database and applies them to a target database. Also called an Applier.

Multithreaded Consumer—A Consumer containing multiple replay threads. The replay threads may be internal threads within the Consumer process, multiple Consumer processes, or multiple Consumer processes each with multiple internal threads. In this specification, the term "multiple consumers" is to be interpreted as "multithreaded consumer." Replication Latency—The time from when a database change is applied to a source database to the time that it is applied to the target database.

Asynchronous Replication—A data replication method in which data is replicated after it has been applied to the source database. The target database will lag the source database by the replication latency of the replication engine.

Synchronous Replication—A data replication method in which data is replicated to the target database in synchronism with the updates to the source database. The updates to both databases are treated as atomic. That is, either they are both made or neither are made. Replication latency under synchronous replication is (near) zero.

User Exit—A facility to allow special programming code to be embedded in a utility to provide functions not otherwise available in the utility. For example, when implemented in a data replication engine, user exits can be provided to filter events or event data, transform events, cleanse events, apply or reapply events, normalize or denormalize the events, or perform special logic based on the event contents including accessing other systems or applications.

Corrupting Change—A change to a database that puts it into an incorrect state.

Corrupted Database—A database that has been put into an incorrect state by corrupting changes.

Detection Algorithm—A user exit that is capable of detecting corrupting changes to a database. The characteristics of corrupting changes are built into the detection-algorithm user exit. For instance, corrupting changes may be all changes made by a specific program during a specified time frame.

Resolution Algorithm—A user exit that determines what to do with a corrupting change. The rules for handling corrupting changes are built into the resolution algorithm. For instance, corrupting changes may be rolled back. Alternatively, corrupting changes could be modified to make them correct.

Recovery Point—A copy of a correct database taken at an earlier time.

Roll Forward—The act of applying correct changes to a recovery point so as to create a later correct copy of the database.

REDO—A method to selectively roll forward a database recovery point, ignoring any corrupting changes.

Roll Back—The act of deleting or replacing corrupting changes made to a database to return the database to a correct state.

UNDO—A method to selectively roll back corrupting changes from a corrupted database.

Natural Flow—The ordered flow of updates as they are applied to a database.

End Users—People, systems, devices, applications, or any other entity that can influence an application or that can use the services that it provides.

II. Overview

Database corruption in a data-processing system can occur because of programming errors (also referred to as a "misbehaving applications"), user errors, administrative staff errors, employee malfeasance, and other causes. This corruption can prevent an application program that depends upon the database from behaving properly, or it can cause the application to return erroneous results. Two methods are described to eliminate this corruption—UNDO and REDO.

The UNDO method utilizes a standard data replication engine in a modified configuration to remove the corruption while the application optionally continues in operation. The approach uses the DBMS (Database Management System) change data to reverse the database to a state that is known to be correct. This operation can be performed while the application remains online and available for processing both update and read-only requests.

More specifically, when database corruption is known or suspected, the UNDO method reads the DBMS change log to access the events involved in the corruption. It can do this from the starting point of corruption to the ending point or alternatively from the ending point to the starting point. The starting and ending points usually are supplied as date/time values or as change-log location values, although in other situations a list of known corrupted transaction or event identifiers can be used to access the events to be undone.

Although not required and not necessarily desired, database changes often are saved in an intermediate Undo Queue; and the user can review the statistics regarding the events to be undone. If incorrect, the Undo Queue can be purged, the starting/ending points can be adjusted, and the Undo Queue can be rebuilt. This process can be repeated until the user is satisfied that he or she has properly captured the corruption events.

The events in the Undo Queue then will be read and processed to apply them in reverse order to the order that they originally occurred and in a manner that backs out or undoes their original changes. More specifically, the events are reversed from their original order and are applied; that is, a commit work is replaced by a begin work, a begin work is replaced by a commit work, an insert is replaced with a delete, a delete is replaced by an insert, and the before and after images of an update are switched (with the before image of the update being applied). Aborted transactions are skipped. Dangling transactions (those without a commit or abort event) are optionally skipped or applied. The UNDO operation changes are typically reapplied against the source database to selectively "roll back" the changes that were originally made erroneously. If replication to a target environment is in use, these changes then can be replicated to a target database to fix the corresponding corruption in that database.

If desired, database changes that were applied subsequent to the corruption can be preserved. In all modes of operation, the application can continue to run while the UNDO operation is taking place.

Note that UNDO is also useful for reversing valid database changes to reset a database to an earlier point-in-time state, for example to reset a database prior to executing a series of regression test cases or to reset a database to its original state after a series of test cases has been run.

The architecture for the UNDO method is leveraged to provide another database restoration method, REDO. Whereas UNDO rolls back selected database changes, REDO rolls forward selected database changes onto an earlier (typically saved) copy of the database to create an up-to-date database that excludes certain operations that are deemed inappropriate or undesirable.

III. Detailed Description of Preferred Embodiments

The present invention is described using the enhanced Shadowbase data replication engine, a configuration described earlier in the section entitled "Gravic Shadowbase Enhanced Data Replication Engine,", to provide novel database-recovery facilities referred to as UNDO and REDO. Though the invention is described using the enhanced Shadowbase data replication engine and HP NonStop servers as an example, other data replication engines or other processing components may be configured to perform the same functions described in the invention. Furthermore the methods of the invention may be implemented independently from any data replication engine. They may be provided by special processes written for this purpose. The processes may use a change log of some sort, such as but not limited to the NonStop Audit Trail, to supply the functions of the Undo Queue.

It is understood that the methods are applicable to and implementable for any database on any platform. Furthermore, the bubbles in the figures of the present invention represent functions rather than processes. Any bubble may be implemented as a separate process or as a set of processes. Alternatively, multiple bubbles (functions) may be provided by a single process. For instance, the Collector and Queue Manager functions can be performed by a single process; the Queue Manager and the Consumer can be combined into a single process; the Collector, Queue Manager, and the Consumer may all be combined into a single process; and so on.

Disk drives in the figures or tables/files mentioned in the text of the present invention typically represent data stores, which may be implemented on disk (for persistence), in memory (for performance), or even in the function that uses them.

Certain terminology is used herein for convenience only and is not to be taken as a limitation on the present invention.

A. Using UNDO to Restore a Corrupted Database

The purpose of UNDO is to restore a corrupted database by rolling back (also referred to as "backing out", or "undoing"), selective corrupted data and leaving the database in a known, consistent, and correct state. A novel advantage of UNDO is that the application can continue to actively perform its processing functions and can continue to update the database while the selective UNDO process is in progress. Corrupted data objects will be returned to their correct state prior to the corruption. However, if a data object has been properly updated following its corruption, the new proper state can optionally be retained.

One preferred embodiment of the UNDO method is to configure the enhanced Shadowbase replication engine to run on the system whose database needs to be protected or restored, as shown in FIG. 9. It is essentially the same configuration as shown in FIG. 7 except that the Queue Manager is modified as described below to support the UNDO function, and the Consumer applies changes to the application database rather than to a remote target database. This configuration of the Shadowbase replication engine is referred to as UNDO.

i. UNDO Rollback of a Corrupted Database

UNDO can be configured permanently on the application system, or it may be configured only when it is needed to repair a corrupted database. If it is configured permanently, the replication engine is installed (FIG. 9) and monitors via its Collector the changes that are added to the Audit Trail (1). The Shadowbase replication engine sends the changes to its Queue Manager, QMGR (2), which writes them into its Queue File, also known as the Undo Queue (3). The changes in the Queue File are available in the event that UNDO should be invoked to correct a corrupted database. However, UNDO is substantially passive in this case during normal application processing, except that it can have an algorithm in it to monitor and detect potential database corruption and then alert systems or database personnel of, or even directly act on, the potential database corruption issue.

If instead, UNDO is configured after a database corruption has occurred, its Collector will read the Audit Trail (1) from some point prior to the corruption up until some point after the corruption and will send these database changes to QMGR (2), which will write the changes to the Undo Queue (3).

In either event, when database corruption occurs or is suspected, UNDO can prepare an optional report from its Undo Queue (4) (or directly from the change log) to provide guidance as to when the corruption began, when it ended, what caused the corruption, and what part of the database was affected. The algorithm that UNDO uses to detect the potential corruption can be resident in any of the UNDO components, and can be implemented, for example, via user exits.

Armed with this information, the system administrator can specify to UNDO the begin and end times of the corruption or alternatively the beginning and ending transactions or change log positions over which the corruption took place. Knowing the parts of the database that were affected or the time range over which the corruption occurred, and optionally knowing the source of the corruption, the system administrator can specify the transactions that should be undone according to program name, process id, user id, ancestor process, file name, table name, event time, or any other information that is known to the change log. Alternatively, the algorithm can automatically determine these attributes of the potential database corruption and then provide this information to the UNDO operation.

Once given a restore specification for database recovery, UNDO begins its recovery processing. The QMGR reads database change events from its Undo Queue (5) (or accesses them via pointers stored in the Undo Queue or specified as a change-event range, as described later) and filters out (or skips or ignores) the events that are of no interest according to the restore specification. It also filters out (or skips) change events that are within the scope of aborted transactions. The algorithm used to decide whether to ignore or process the changes can be implemented via user exits, for example, in any of the processes shown.

A feature of UNDO is that the QMGR reads the changes in its Undo Queue from the newest to the oldest (called "rolling back" thru the changes) as opposed to some prior art database-recovery facilities that read changes in oldest to newest order.

As it reads each change, QMGR converts it into a reverse operation, described below, to undo the effect of the change on the database. It sends these undo events to the Consumer (6), which will apply them to the application database (7) in order to return the database to its correct state before the corruption occurred. As the changes are being processed, an algorithm is used which can be implemented, for example, via user exits, to determine whether the change is an actual corrupting change, and whether it should be ignored or processed. During this process, the algorithm can optionally modify the corrupting data to make it correct, thereby allowing the corrupting change to be corrected, thereby allowing the change to be kept and applied to the database.

As with the normal configurations of the Shadowbase data replication engine, multiple Consumers or applier threads can be configured with UNDO to speed the database recovery if the Consumers are a bottleneck. Another method to improve performance is to combine multiple individual transactions into a single transaction so long as database consistency is preserved following the commit of the larger transaction.

In an alternative configuration, the Undo Queue used by UNDO may contain only pointers to the change events stored in the Audit Trail rather than the change events themselves. This is shown in FIG. 10. During normal operation of the application (or following a corruptive event and the subsequent installation of UNDO to back out the corruption), the Shadowbase Collector follows the Audit Trail (1). However, rather than passing change events to QMGR, as described earlier, the Collector instead passes pointers to the change events to the QMGR (2). Only the pointers to the change events in the Audit Trail are stored in the Undo Queue (3). As in the earlier case, the Undo Queue can be used to prepare a report for the administrator or user specifying the parameters of the rollback (4) for him or her to verify the rollback specification.

Once all pointers to the corrupting events have been identified, QMGR will read each pointer in reverse time order (5) and will request that the Collector fetch the corresponding change event from the Audit Trail (6). QMGR will reverse the database operations and will forward the corrective changes to the Consumer (7), which will apply them to the corrupted database (8) to roll back the database corruption.

In another alternative configuration, the change events to be backed out may be specified as a range of events by date/time, as a range of events by transaction identifiers, or by any other means by which a continuous range or related set of change events may be specified. This is shown in FIG. 11. Using this configuration, an administrator or user specifies to the Shadowbase replication engine the range of events to be backed out (1). The specification may go, for example, to the Shadowbase Collector (2). The Collector will then read the changes in reverse order from the change log throughout this range (3). It will send each change event satisfying the selection logic to the QMGR (4) (which may be part of the Collector or may be implemented as a separate process). The QMGR reverses the change, interchanging begin-transaction and end-transaction directives, changing inserts to deletes and deletes to inserts, and reversing updates. The QMGR may optionally prepare a report (5) for the administrator to verify that the range specified for the UNDO is correct. The reversed changes in reverse-time order are sent to the Consumer (6), which will apply these changes to the application database (7), thus reversing the effects of the changes in the application database. Unlike prior art methods, this method of processing the change log data requires only one pass over the data to be undone, and it processes the events to be reversed in the order that they are to be applied, thereby avoiding a separate set of passes and reversing operations.

In the descriptions that follow, reference is made to change events stored in the Undo Queue or in the Redo Queue. It is understood that in each case, change events may also be represented in these queues as pointers to the change log or by a change-event range of the events in the change log that is specified to UNDO, as shown in FIG. 10 and FIG. 11.

ii. UNDO Reverse Operations

As QMGR reads from the Undo Queue pertinent database changes that must be reversed, it changes them into the database operations that will undo the effect of the original change. These undo operations are shown in Table 1:

TABLE 1

UNDO Database Reversal Operations

| Original Change | UNDO Change | Effect |
| --- | --- | --- |
| Begin transaction | Commit transaction | Commit an UNDO transaction |
| Insert Row A | Delete Row A | An erroneously inserted row is deleted |
| Delete Row A | Insert Row A | An erroneously deleted row is reinserted |
| Update Row A from x to y | Update Row A from y to x | An erroneous update is reversed |
| Commit transaction | Begin transaction | Begin an UNDO transaction |

The UNDO operations are accomplished via the before images that are contained in each database event in the Undo Queue. Recall that each queued event contains the before and after images of the row that was changed:

1. The before image of an insert is a null row (that is, the row does not exist). Its after image is the value of the row that was inserted.
2. The before image of an update is the value of the row before the update was made. Its after image is the value of the row after the update was made.
3. The before image of a delete is the value of the row before the delete was made. Its after image is a null row (that is, the row does not exist).

The UNDO changes are bundled into a transaction in the reverse order of the corrupting transaction for applying to the application database. The Commit directive of the corrupting transaction becomes the Begin directive for the UNDO transaction. Likewise, the Begin directive of the corrupting transaction becomes the Commit directive for the UNDO transaction.

Thus, the before image of each change event in the Undo Queue is the value to which the row will be restored.

For instance, consider the sequence of operations shown in the left half of FIG. 12. A corrupted sequence of operations involves Row A in the database. Row A was initially set to the value "w." The first operation of the corrupted sequence deleted Row A. The next operation inserted Row A with a value of "x," and the last operation changed the contents of Row A from "x" to "y." At the end of the corruption sequence, row A is left with the value "y." In this example, the operations are shown as being within the scope of one transaction. However, multiple transactions could have been involved. Alternatively, the changes may have been applied without any transaction control.

This sequence of operations has been identified by the system administrator as being erroneous, and he or she has created a restore specification for UNDO to back out the sequence.

In this example, the transaction boundaries evidenced by the begin/commit commands of the corrupting transactions are used to identify the corrupting transactions. They also are used to construct the reversing transactions and to identify aborted transactions that are ignored by UNDO. UNDO will read the change operations in the corrupted sequence from the Undo Queue in reverse order. In this example:

1. The first entry UNDO will read is the last operation of the corrupted sequence—the commit directive. UNDO will convert this to a begin-transaction directive to start a reversing transaction. (If this were an abort directive, the abort directive and the rest of the events inside that transaction will be skipped.)

2. The next event is the "update Row A from x to y" operation. The before image of this entry is a value of "x" for Row A, and UNDO will update Row A to "x."
3. The next entry in the Undo Queue is the insert operation. Therefore, UNDO will delete Row A.
4. The fourth operation that UNDO reads from the Undo Queue is the "delete Row A" operation. Its before image is "w," so UNDO will insert Row A with a value of "w."
5. Finally, the begin transaction event is read and is converted to a commit transaction to complete the UNDO transaction that will be applied to the application database.

The UNDO sequence has thus returned the database to its state before the corruption took place—a value of "w."

Though this simple example shows UNDO rolling back just three operations for one row in one table, an actual UNDO operation might reverse thousands or more operations on thousands or more rows for many different files and tables.

An alternate embodiment of UNDO to that described above is to incorporate the UNDO logic into the Collector and to use the change log (Audit Trail in this example) as the Undo Queue. Additionally, sets of rows may be changed at the same time (for example, SQL statement-level events) rather than individual rows. The UNDO actions are otherwise the same.

In some database systems, disk blocks are changed rather than rows in tables. A disk block length typically is equal to the length of one or more physical disk sectors and can hold several rows. The UNDO logic described herein is equally applicable to systems that apply changes to blocks rather than to individual rows.

In some database systems, individual columns (or column sets) are changed rather than rows in tables (for example, in a column-based, scalar, or linear database). The UNDO logic described herein is equally applicable to systems that apply changes to columns (or column sets) rather than to individual rows.

iii. Preserving Subsequent Changes

A novel feature of UNDO is that it can selectively reverse corruption of an application database while the application continues to run and to update the database. This is particularly useful if the corruption is isolated to a subset of the database data or, for example, to a particular set of users. This improves the availability of the application. Prior art methods typically require an application outage while they recover the corrupted data or they cannot selectively recover individual events as they require an all-or-nothing approach.

Another novel feature is that UNDO can also selectively preserve changes made to the data after the data was corrupted. UNDO accomplishes this by detecting changes that have occurred to a corrupted data object following the corruption. If a corrupted data object has been modified subsequently, its value can optionally be considered now to be valid; and it is (optionally) left intact. Otherwise, its value is reversed to reflect its value prior to the corruption.

For instance, consider the example of FIG. 12 under the condition that the application continues to run following the corruptive events. If Row A has been further modified following the corrupted sequence, the corrupted value will be overwritten by a valid value. Activating the sequence described above will overwrite the valid value with the original value prior to the corruption; and the new, valid value will be lost. In some cases, it may be desirable to return the corrupted portion of the database to a previous point in time, as has been described. However, if the intent is to have the database reflect the latest correct value, the UNDO procedure is enhanced so that new values that have been entered into the database since the corruption occurred are protected.

FIG. 13 reflects both the problem and the solution. In the example from FIG. 12, following the corrupted transaction but prior to the UNDO operation, another valid transaction is executed and updates Row A from its corrupted value "y" to a correct value "z." The result of the UNDO operation, as described above, will result in a value for Row A of "w." This was its correct value before the corruption occurred. The new, correct value of "z" has been lost.

A subsequent valid update can be detected during the UNDO operation by comparing the after image of the last corrupting database operation (this is the same as the before value after event reversal) to the current value of that row in the database. If they are different, the row has been subsequently modified and should not be changed. Note that this comparison can be performed for any/every reversing operation if it is too difficult to determine the last corrupting database operation.

With reference to FIG. 13, the last operation in the corrupted transaction is "update Row A from x to y." The before image of this operation is "x," and its after image is "y." UNDO desires to undo this operation with "update Row A from y to x." If there has been no subsequent operation on Row A, its database value will still be "y," which is the value of the after image of the corrupted operation. Therefore, the row has been corrupted and can be corrected. However, in the case of FIG. 13, the value of Row A has been modified by transaction n+1 and is now "z," which is different from the after image ("y") of the corrupted update. Therefore, a subsequent operation has been performed on Row A; and no UNDO operations should be performed if the intent is to protect subsequent operations. This logic will prevent the earlier insert and delete operations from being executed. The result is that Row A is left with its ultimate correct value of "z" rather than its original pre-corruption value of "w."

A problem occurs with this algorithm if a subsequent valid change sets the value of the data object to the same value that it had at the end of the corruption event. In this case, the data object will be reset to its value prior to the corruption, thus losing the valid value. This problem can be resolved by using version information in the rows. The version information can be, for instance, a timestamp or a row version number. When beginning the UNDO process on a data object, if the current version of the row is later than the version of the reversing operation as contained in the Undo Queue (Queue File) or change log if the change log is acting as the Undo Queue, the row has been subsequently updated and should not be rolled back.

iv. Undoing DDL Changes

A limitation of the UNDO method is that not all database changes may be capable of being rolled back. For instance, in HP NonStop systems, if a column is added to a table, the file management system in some cases will not allow this column to be deleted. UNDO can roll back all DML changes and some DDL changes but may not be able to roll back other DDL changes. In this case, the operations can be reported and skipped. Alternatively, this limitation is resolved by REDO, described later in the section entitled, "REDO Roll-Forward of a Corrupted Database."

B. Using UNDO to Restore a Corrupted Target Database

The use of UNDO to restore a corrupted application database, as described above, can be extended to the restoration of a corrupted target database in a replication environment. In this case, the application is running on a source system and is updating a source database. Changes made to the source database are replicated in real time to a target database running on a target system, as shown in FIG. 7. The target database may be used for many purposes, such as a disaster-recovery backup system, a data warehouse, a historical archival system, or as a read replica to support massive query operations.

There are several ways in which the target database may become corrupted. A corrupted target database may be restored via UNDO. In each of the cases described below, the application may continue to run and to provide updates that are replicated to the target database.

i. Replicated Corruption

In a replicated environment, all (or selected) database changes made to the source database are replicated to the target system and are applied to the target database. This can include changes that corrupt the source database. Thus, in a replication environment, any corrupting changes applied to the source database also may be replicated and applied to the target database, thus corrupting it as well.

By the same token, changes applied to the source database by UNDO to correct the source database corruption also will be replicated to the target database, thus correcting the target database's corruption. This method is described above in the section entitled "UNDO Rollback of a Corrupted Database."

To simultaneously correct both a source and a target database, two instances of the Shadowbase replication engine must be deployed, as shown in FIG. 14. One instance is the normal Shadowbase replication engine used for production to keep the target database in synchronism with the source database. The other is UNDO running on the source system (or running on another system but against the source database). Note that two instances are shown for clarity as one instance could be configured to perform both tasks simultaneously.

To correct database corruption, the corrupted range of database updates are loaded from the Audit Trail into the source side Undo Queue of UNDO (1) by its Collector. Once this has been completed, the Consumer in UNDO reads (or receives) the reversed corrupted changes in reverse-time order (2) and applies them to the source database (3) to reverse the corrupted change events. Alternatively, the Consumer in UNDO reads (or receives) the corrupted changes in time order (2) and reverses then applies them to the source database (3) to reverse the corrupted change events.

As each reverse event is posted to the source database, that event is written to the Audit Trail (4) and is replicated by the Shadowbase replication engine (5) to the target database (6).

Consequently, the target database is corrected and is in synchronism with the source database (albeit after a short time delay). Both databases end up being returned to an earlier point in time that is known to be correct except that valid changes made to the source database following the corrupting events are optionally preserved at both the source and target databases, described earlier in the section entitled "Preserving Subsequent Changes."

ii. Split Transactions

A class of faults that can result in target-database corruption involves applying a single source-database transaction as two or more independent target-database transactions. Should a target system fault cause only a portion of the source transaction to be applied to the target database, the target database has been corrupted. UNDO can be used to back out the partial transactions from the target database after it has been returned to service and to return it to a correct state. The target database can then be used directly (e.g., if this is a disaster-recovery scenario and the source system has failed), or the corrected target database then can be synchronized with the source database by rolling forward transactions that have completed at the source following the target-system failure.

Similarly, split transaction corruption can also be caused by a source system failure or by a replication-network failure.

One example of this is Split Transactions. As shown in FIG. 15, in some embodiments of the Shadowbase data replication engine, a source transaction (1) can be split among multiple Consumers as independent transactions (2), (3) to provide parallel execution of database changes. Some of the transaction's database commands will be routed to one Consumer (4), and other commands may be routed to other Consumers (5). In certain configurations, the Consumers each will apply their individual partial transactions to the target database (6) as independent transactions with different transaction IDs. The result is that the original source transaction may be replaced by two or more transactions at the target system, each representing just a portion of the original source transaction.

A problem occurs if a source or target system failure allows some of these partial transactions to complete, but the failure occurs before they all can complete. The result is that a transaction has only been partially applied to the target database, causing potential database-consistency issues at the target database.

Split transactions are monitored in the Shadowbase replication engine at the target system via a Transaction ID (TID) file (7). If a transaction is to be split, its source transaction ID and the ID of all of the target subtransactions into which it is split are recorded in the TID file. As each subtransaction completes, its completion is noted in the TID file via a commit flag. Thus, if there should be a source-system or target-system failure, the TID file can be referenced to see if any source transactions have been only partially applied. If so, the TID file stores the target side subtransaction ID(s) of the subtransactions that have been applied and need to be backed out.

FIG. 15 shows the contents (8) of the TID file for the split transaction shown as an example in that figure. The TID file contains the transaction ID of the source system transaction (tx1). Grouped with the source transaction ID are the target subtransaction IDs (txa, txb), into which the source transaction has been split. Each target subtransaction carries with it a commit flag that is set when the target subtransaction has successfully committed. This gives UNDO the information it needs to determine which if any target subtransactions were not completed, and if so, which target subtransactions may need to be rolled back in the event of a failover. Specifically, if some but not all of the target subtransactions have committed, then those that have committed must typically be rolled back.

Once a split transaction has successfully completed or has been backed out, its entry in the TID file is deleted.

The TID file can be memory-resident. It is only necessary that it be persistent in the face of a target-system failure.

By using UNDO on the target system, a system administrator can reverse the completed partial subtransactions and can restore the target database to a correct state. UNDO configured on the target system is illustrated in FIG. 16. As replicated changes are applied to the target database, the respective source-transaction ID and target-subtransaction IDs are recorded in the TID file. The transaction change events are entered into the target Audit Trail (1) under their respective subtransaction IDs. If changes are to be undone, UNDO is instantiated on the target system (2). The corrupted range of changes are read from the target Audit Trail via the UNDO Collector (3), which sends the changes to its QMGR (4) for storing in the Undo Queue (5). When the corrupted range of changes has been moved to the Undo Queue, QMGR will read them in reverse order (6). Using the TID file to determine which transactions should be reversed, UNDO will reverse each operation in those transactions and will send the reverse operations to the UNDO Consumer (7), as described earlier. The Consumer will apply the UNDO operations to the target database (8), thus restoring it to its uncorrupted state.

Note that the TID file can be a physical file on disk or a memory-based data structure that is available to the pertinent processes. It can also be used by the Collector to filter out the transactions to be kept before sending the events to the QMGR, by the QMGR to perform the filtering before storing the transactions or forwarding them, or by the Consumers to know which transactions are to be processed and which are to be skipped.

iii. Distributed Transactions

From a target-database corruption viewpoint, a situation similar to Split Transactions is Distributed Transactions. A distributed transaction is one that spans systems. Some updates within the scope of the transaction are made to one system, and others are made to other systems.

An example of a distributed transaction is shown in FIG. 17. The following transaction is issued by System 1 (1):

begin transaction
insert Row A into Database 1 (DB1)
insert Row B into Database 2 (DB2)
commit transaction The problem is that DB1 is on System 1 (2), and DB2 is on another system, System 2 (3). System 1 is called the root node of the transaction. System 2 is a subordinate node. There may be one or more subordinate nodes (only one is shown in this example).

To accommodate the distributed transaction, the transaction manager on the source system will split the transaction into two transactions. One transaction will update DB1 on System 1 (4), and the other transaction will update DB2 on System 2 (5). Each system uses its own Shadowbase data replication engine (6), (7) to replicate its transaction to the target system. There, in some Shadowbase configurations, the two transactions will be applied to the target database (8) as two independent transactions (9), (10).

Both the root transaction and the subordinate transactions typically contain information describing the entire transaction. For instance, the root transaction may contain information indicating the number of subordinate transactions; and each subordinate transaction may contain the transaction ID of the root transaction. This information is used to describe the distributed transaction to the target system and is recorded in the TID file (11), as described earlier in the section entitled "Split Transactions."

The problem is then similar to that described for split transactions except that the corruption could be caused by the failure of one (or any/all) source systems or by the failure of the target system. Should a root system or subordinate source system fail, or if the target system should fail, and if only some of the subtransactions are applied to the target database, the target database has been corrupted. As described with respect to FIG. 16, UNDO can use the TID file to determine which subtransactions (root or subordinate) were applied to the target database so that it can back them out.

iv. Precommits

A data replication engine may compete with an application to make updates to a database. In these cases, it is possible for the data replication engine and the application to deadlock, preventing either from continuing.

For instance, FIG. 18 illustrates an active/active configuration in which applications on both the source and target systems are applying updates to the database. Consider that the application on the target database is executing a transaction, tx1 (1), that is updating Row A of the target database followed by an update to Row B. A replicated transaction, tx2 (2), needs to update Row B followed by an update to Row A. It is possible that tx1 will lock and update Row A and that tx2 will lock and update Row B before either transaction gets to its second update of Row B and Row A respectively. Neither transaction can proceed because the rows they must now update are locked by the other transaction. The replication engine and the application are deadlocked.

The Shadowbase replication engine provides a precommit facility that solves this problem. Precommit allows the replication engine to commit that part of a partial transaction that it has successfully applied (3). This releases the locks held by the replication engine, thus allowing the application to complete its transaction. The replication engine can then start a new transaction, tx3, which completes its original transaction, tx2.

There are other cases in which the precommit function is useful. For instance, an application may be performing a long-running query or batch update. If the replication engine locks on an update made by the application, it is quite possible that the application may later want to update a data item that is already locked by the replication engine, thus creating a deadlock. In this case, the replication engine can precommit the work it has already done as soon as it encounters a lock to ensure that a deadlock will not occur.

In general, whenever the replication engine encounters a lock or other blocking event, it may be desirable to precommit its current work if it must wait for more than a specified time to avoid the possibility of a deadlock.

A challenge with precommitting is that a single replicated source transaction has been split into two or more independent target transactions. The replication engine maps the source transaction to the multiple target transactions via entries in its TID file, as described earlier in the section entitled "Split Transactions."

As with the previous examples, if a target system failure should occur after the precommitted transaction has completed but before its continuation transaction can complete, the target database is corrupted. Also, if the transaction aborts following the precommit, means must be provided for backing out the precommitted but aborted updates. UNDO can use the TID file to identify the partial transaction and to back it out, thus restoring integrity to the target database, as described earlier with respect to FIG. 16.

v. Undoing False Commits of Hung Transactions

A common problem with synchronously replicating transactions from a source system to a target system is hung transactions. With synchronous replication, the source system cannot commit the transaction until it is assured that all target systems can commit the transaction. The transaction is either committed on all systems, or it is aborted (or otherwise undone) on all systems.

A classic technique for synchronous replication is the use of the two-phase commit protocol, as shown in FIG. 19. With this protocol, the source system begins a transaction that includes all target systems within the scope of the transaction (1). As the source system sends each update made at the source to the target systems (2), it waits until it gets a confirmation from each target system that it has received the update before sending the next update (this technique is also called Dual Writes). When the source system has sent all updates within the transaction to all target systems, it enters Phase 1 of the two-phase commit protocol, the Prepare Phase. It asks all target systems if they have safe-stored (or applied) all changes and are ready to commit the transaction (3). If all target systems reply affirmatively (4), the source system enters Phase 2 of the protocol, the Commit Phase. It sends a commit directive to all target systems telling them to commit the transaction (5), and it commits the transaction on the source system. If any target system responds that it cannot commit, or if any target system should not reply, the source system sends an abort directive to all target systems, and all systems abort the transaction. In this way, the transaction is either committed or aborted on all systems.

Another technique for synchronous replication is Coordinated Commits. Using this technique, the source system sends a begin-transaction directive to all target systems, and each target system begins an independent transaction. Changes within the scope of the source's transaction are sent asynchronously to the targets so that the source application is not delayed by having to wait for target responses to each and every update. However, at commit time, a procedure similar to the dual-write two-phase protocol is followed. All target systems are asked if they are ready to commit. Alternatively, each target system can keep the source system updated with respect to its receipt of updates, in which case this step can be bypassed. If all target systems acknowledge that they are ready to commit, the source system commits the transaction at the source and sends a commit directive to all target systems. Each target system will then commit its independent transaction. If one or more target systems cannot commit, the source system sends an abort directive to all target systems. In this way, the transaction is either committed or aborted on all systems.

A problem occurs if a source-system failure, a communication error, or some other fault prevents a target system from receiving the final commit or abort directive from the source system [step (5) in FIG. 19]. The target system does not know the final outcome of the transaction and therefore does not know whether to commit or abort the transaction. This is a hung transaction.

Though the above description used synchronous replication as an example, hung transactions also occur with asynchronous replication in a similar manner. With asynchronous replication, the target system begins a transaction that is independent of the source transaction. As it receives updates for that transaction, it applies them to the database. When the transaction completes at the source system, the source system will commit or abort its transaction. It will then send a commit or abort directive to the target system. Should the source system or replication network fail before the target system receives the transaction-completion directive, it does not know whether the source system committed or aborted the transaction. This is a hung transaction. Hung transactions are typically solved either by business rules or by manual intervention. For instance, the business rule might be to always abort a hung transaction, report it, and manually reenter it if the transaction had in fact been committed by the source system. Alternatively, the business rule may be to always commit a hung transaction, report it, and then to manually back it out if, in fact, the source system had aborted it. Another option is to do nothing except to report it and to commit or abort the transaction manually.

Some of these actions are within the scope of the system's transaction management system. For instance, if the action is to abort the target transaction and later reenter it if that was an erroneous action to take, the transaction can be rolled forward by the transaction manager. However, if the action was to commit the transaction and later abort it, transaction managers are typically not capable of rolling back an old transaction that has already been committed. This is a task that UNDO can accomplish. All that is required is for the system administrator or user to provide UNDO with the transaction ID of the transaction that was erroneously committed; and UNDO will selectively roll it back, as described earlier.

Alternatively, automated means may be employed to detect a hung transaction and to determine that it was erroneously committed. The transaction ID of the erroneous transaction can be passed to UNDO to roll back the transaction, thus automating the correction process and eliminating any manual effort.

As described later, a similar technique can be used with Redo to replay a hung transaction that was erroneously aborted. This technique is described in the section entitled "Redoing False Aborts of Hung Transaction.". Using these two techniques, the resolution of hung transactions can be completely automated, eliminating the requirement for any manual intervention.

A similar use for UNDO is to delete a specific change in a transaction, but otherwise commit the transaction. This may be useful, for instance, with long-running transactions such as batch transactions. Batch transactions can include thousands or millions of updates and can take hours to run. If at some point it is determined that one change may be a problem, UNDO can be invoked to roll back just that change.

For instance, perhaps a header row (a parent) in a massive transaction has thousands of detail rows (children) associated with it; and the transaction becomes hung. Perhaps the business rule is to abort hung transactions. However, doing so in this case would delete thousands of child rows that took a long time to send over the communication channel from the source system to the target system. By simply rolling back just the header row with UNDO and then committing the transaction, all of the detail rows become invisible (for example, if they can only be accessed via the header row) and in effect have been aborted, though they are still resident on the target system. If it turns out that the transaction should have instead been committed, rather than resending all of the detail rows, it is only necessary to roll forward the header row. This can be done with REDO, as described next.

C. Using REDO to Restore a Corrupted Database

It is often necessary to make upgrades in the functionality or the capacity of an existing computer system. Upgrades may include changing application versions, adding processors or disks for expanded capacity, or modifying the database structure to accommodate new functionality. When such a major change to a system's infrastructure is to be made, there is always the concern that problems will be encountered and that the system will have to be returned to its initial state (a procedure often referred to as failback or fallback). Often, problems encountered with the upgraded system may cause corruption of the application database. If this occurs, the database must be restored to a correct state; and the desired non-corrupting database changes that were made with the upgraded system then must be reapplied to the database to bring it into a current and correct state before the application can be resumed.

Additionally, it is a common and a prior art best-practice to make periodic copies of a database, for example thru a backup operation, to save as a recovery point should the current database be lost or corrupted via other means. The REDO methods described below can be used with these periodic best-practice database copies to restore the copy of the database to a current and correct state to allow application operations to subsequently commence.

i. REDO Roll-Forward of a Corrupted Database

These challenges are resolved (or at least substantially improved) with REDO. The REDO engine is shown in FIG. 20. It has a similar architecture as that for UNDO, shown in FIG. 9, except that the Undo Queue is now called the Redo Queue.

When the database of a system undergoing an upgrade is to be protected with REDO, the first step is to save a "fast recovery" copy (or "recovery point") of the application database, for example by unmirroring the application database (1), as shown in FIG. 20 and as described in more detail in the section entitled "Recent Prior art Recovery Techniques for Roll-Forward Database Recovery." In this example using the database mirrors, one side of the mirror (the saved mirror) is saved for potential database recovery in the event of a problem. The other half (the active mirror) serves as the active database for the upgraded application (2). A new mirror can optionally be added to remirror the active database to provide disk-mirror fault tolerance.

Alternatively, instead of using a split-mirror recovery point, a standard backup copy of the database using magnetic tape or virtual tape may be used as the recovery point. However, in this case, REDO will have to roll forward the backed-up database from the time of the last backup rather than from the time that the mirror was split. The use of magnetic tape or virtual tape backup may be necessary if the database corruption happened during normal processing with no a priori indication that there might be a corruption problem.

The next step is to upgrade the application infrastructure environment, the database, and any other system components that are to be upgraded. The active mirror now reflects the upgraded database. The newly upgraded environment is then started (if it is not already running).

As the upgraded application runs, updates made to the application database (that is, to the active mirror) are saved in the Audit Trail (2). In a preferred embodiment to the current invention, the REDO Collector is configured and running when the new application starts processing. (Alternatively, REDO could be configured and started later after a fallback decision is made. However this can increase total application downtime as the REDO data collection typically needs to complete before the fallback is made to the prior database.) The REDO Collector follows the Audit Trail (3) and captures the REDO data by sending each change to the QMGR (4), which writes the change into its Redo Queue (5).

If after a while, the user determines that the updated system is running successfully and is deemed to be correct, the activities of REDO can be terminated; and the contents of its Redo Queue can be deleted.

However, if a problem should arise, for example data corruption of the database, a restore point of the database can be rolled forward with legitimate changes, as shown in FIG. 21. In some cases, the problem may be detected externally to the system for example by customers complaining that something isn't right or the operations personnel detecting missing data or other issues. In other cases, the problem may be detected, for example, via an algorithm, often implemented via user exits, for example where the user exits determine that accounts do not balance.

With REDO, the application may not be able to continue to run as it typically requires a current database to properly provide its services (though in some special cases, this restriction may be relaxed). The database is not current until REDO has completed the roll-forward.

The QMGR in REDO reads the changes from its REDO queue (1) in forward-time order. It will thus roll-forward thru these changes and either discard (or fix) the corrupting changes, and apply the correct changes, to restore the database to a correct state.

More specifically, any invalid or undesirable changes (such as to tables that do not exist) can be detected for example by a user exit and are filtered out (ignored), and valid changes are sent to the Consumer (2). The Consumer alternatively can also detect invalid or undesirable changes for example via user exits and can filter out the corrupting changes, and apply the non-corrupt changes (3) to the saved mirror of the initial database (4). Alternatively, the undesirable or corrupting changes can be modified, for example via user exits, to make them correct or valid, and then the Consumer can apply them to the database.

Upon emptying the Redo Queue, the application can mount the saved mirror (4) and can begin its processing functions. At this time, the corrupted mirror can be revived (5) by copying the now-current database from the saved mirror to the corrupted mirror. Reviving typically can be accomplished while the application is running.

In an alternative embodiment, the saved mirror can first be restored as the active database so that the original application can be restarted immediately; and the steps (1) thru (5) can be applied against an active database that is available for application access during the Redo processing.

If a magnetic-tape or virtual-tape backup is used instead of a split mirror, the recovery process is similar to the above description except that the database must first be loaded with the backup copy. REDO must have all of the changes in its Redo Queue from the time that the backup was made. As described above, REDO reads the changes from its Redo Queue and applies the non-corrupting changes to the backup copy.

The functions shown in the figures may be implemented as separate processes, as sets of processes, or may be combined in any combination into single processes. The algorithms, to detect the database corruption and then to either ignore or modify them to correct them, can be implemented for example via user exits and optionally can exist in any of the processes shown. The Redo Queue can be the change log or a copy of the change log that is accessible during the recovery process.

If desired, REDO can set aside invalid changes for later processing, such as adding them to the active database via a SQL JOIN operation after the appropriate schema changes are made to the database, if necessary.

ii. Using REDO to Restore a Corrupted Target Database

REDO can be used to recover a corrupted target database. A target database may be corrupted by replicating corruption changes from the source system. The target database may also become corrupted with incomplete split transactions, distributed transactions, hung transactions, and precommits. These latter problems typically require rolling back incomplete transactions, as described in more detail in the section entitled "Using UNDO to Restore a Corrupted Target Database." However, REDO can be used to correct these incomplete transactions if a recovery point and change log is available for the database. REDO may be a preferable approach over UNDO for any of the same reasons that REDO may be preferable over UNDO, including size of database corruption, time to recovery, or other reasons previously mentioned.

As mentioned above, hung transactions are another challenge to keep a database consistent, and may require additional processing as described in the following referenced sections. Both UNDO (see the section entitled "Undoing False Commits of Hung Transactions") and REDO (see the section entitled "Redoing False Aborts of Hung Transactions") play a role in resolving hung transactions.

In a replicated environment, if a target database may have to be rolled forward by the REDO method, a copy of it typically is saved, for example, by splitting its mirrored database. Alternatively, a backup tape copy may be used. When the decision is made to abandon running the upgraded or modified environment and to return to the original environment, the target database can be recovered from the saved copy, for example, by restoring the saved mirror and then rolling the saved mirror forward in a manner described above for rolling forward the source database. Alternatively, the target database can be restored from the tape backup copy.

In order to roll forward the target database with REDO, the target database must have been saved prior to running the upgraded or modified application environment (or if it is in the same state as the source database at the start of the operation, it can be restored from the source's saved copy (recovery point)).

To roll forward the database, the saved target copy is made active. This can be accomplished quickly at the target by using a saved mirror/restore operation similar to the source. Rolling forward changes on the source database as described in the section entitled "REDO Roll-Forward of a Corrupted Database" will cause these changes to be replicated to the target database, thus restoring it to the same consistent state as the source database.

Alternatively, the target database can be restored independently by using REDO to roll forward changes to a saved target copy, as described in the section entitled, "REDO Roll-Forward of a Corrupted Database."

iii. Redoing False Aborts of Hung Transactions

As described in the section entitled "Undoing False Commits of Hung Transactions," a transaction that does not receive a final commit or abort transaction event or indicator or directive is left in an indeterminate state. Business rules may dictate whether the hung transaction should be committed or aborted. If the decision is to commit it, and the decision is wrong, the transaction must be later aborted. This can be accomplished with UNDO, and this process can be automated.

Likewise, if the decision is to abort the transaction, and the decision is wrong, the transaction must be reentered. This can be done manually, or REDO can be instructed to roll forward the aborted transaction. This can be accomplished by manually requesting REDO to roll forward the transaction, or automated means may be employed to determine the aborted transaction and to inform REDO to roll it forward.

If automated means are implemented to detect hung transactions and to roll back erroneously committed hung transactions with UNDO or to roll forward erroneously aborted hung transactions with REDO, or a combination of both is needed for transactions previously handled incorrectly, the resolution of hung transactions no longer requires manual intervention.

iv. REDO Configuration Options

Similar to UNDO, in alternative embodiments, the Redo Queue may contain just pointers to the change events in the change log; or REDO may be given a consecutive range of change events to back out, in which case there is no Redo Queue. These configuration options are shown in FIG. 22 through FIG. 24.

FIG. 22 shows the configuration of REDO as described previously. The Redo Queue contains the events that have been applied to the database. To roll forward these changes to a recovery point database, the REDO QMGR reads the events to be rolled forward in time order from the Redo Queue (1) and sends them to the Consumer (2). The Consumer applies these to the saved copy of the database (for instance, the saved mirror) to eliminate the erroneous changes (3). When the saved copy has been restored, the application can be restarted and the corrupted half of the mirror revived (4).

FIG. 23 shows the REDO configuration in which the Redo Queue holds pointers to the change events rather than the change events themselves. The pointers are read from the Redo Queue by QMGR in time order (1), which requests the Collector to fetch the change event from the change log (2). The events are sent to the Consumer (3), which applies them to the saved copy of the database (4) in order to roll forward the saved copy and eliminate the erroneous changes. When the saved copy has been restored, the application can be restarted and the corrupted half of the mirror revived (5).

FIG. 24 shows REDO using a change-event range to control the roll back. The system administrator or other user enters the beginning and ending change to roll forward by specifying a date/time range, a transaction identifier range, or some other information describing the set of changes to be rolled forward (1). Working through this range, the Collector accesses the specified changes from the change log in time order (2) and forwards them to the Consumer (3). The Consumer applies these to the saved copy of the database to roll forward the changes to be re-applied (4). When the saved copy has been restored, the application can be restarted and the corrupted half of the mirror revived (5).

D. Natural Flow Order Versus Transaction Order

In general, several transactions are being processed at the same time by an application and overlap each other. The ACID properties of transactions ensure through locking mechanisms that each transaction completes properly regardless of other associated transactions that are being concurrently processed. That is, as a transaction updates data objects, it locks those data objects so that no other transaction can update them. The locks are released when the transaction commits.

If the results of a transaction need to be rolled back, most prior art methods roll back transactions in reverse order. A transaction is rolled back in its entirety before the next previous transaction is processed. As demonstrated below, this can lead to referential integrity violations of the database during the rollback process.

The current invention roles back database operations, not transactions, in reverse order. Thus, the activity of multiple transactions is being rolled back in the reverse order in which they occurred. This is called the natural flow of database updates. It is shown below that rolling back updates in natural-flow order will not lead to referential integrity violations.

Consider a banking application that manages several customer accounts. The database has a rule that no account may have a negative balance. The example begins with a customer account that has a zero balance. Two transactions arrive at the banking application at substantially the same time. One transaction is a deposit to the account of $200. The other transaction is the clearing of a $100 check. Clearly, the deposit must clear before the check transaction is processed, or the check will be bounced.

In this case, the check transaction arrives first. However, the debiting of the account by the check amount is delayed by other processing activity associated with clearing the check. Before the check amount can be debited by the first transaction, the deposit transaction is received by the banking application. It is processed quickly, and the deposit amount is credited before the check amount is debited. The account balance remains positive, and the check is honored.

This sequence of events is shown in Table 2. In this table, transaction Tx1 is the check transaction and transaction Tx2 is the deposit transaction.

TABLE 2

Example Banking Transactions

| Transaction Operation | | Account Value |
|---|---|---|
| Tx1 Begin: | $100 check | $0 |
| Tx2 Begin: | $200 deposit | $0 |
| Tx2 Update: | credit $200 | $200 |
| Tx2 Commit: | commit deposit | $200 |
| Tx1 Update: | debit $100 | $100 |
| Tx1 Commit: | commit check | $100 |

It is then decided that this transaction must be rolled back. In the present invention, this is the job of UNDO. UNDO will reverse each operation and apply them to the database in reverse order, as shown in FIG. 28 table 280:

The transactions have been rolled back and the account is left with its initial value of $0.

Many prior art rollback methods roll back in reverse transaction order rather than in natural flow order. This is shown in FIG. 29 table 290, where in transaction Tx2 is rolled back before Tx1:

Again, the transactions have been rolled back and the account is left with its initial balance of $0. However, in the rollback process, the account has taken on a negative value of $100. This is a referential integrity violation. If the database had referential integrity checking enabled for intra-transaction activity, transaction Tx2 would have been aborted and the rollback would have been incorrect. The checking account would have been left with a balance of $100 rather than $0.

Thus, rolling back transactions in reverse natural flow order as is done by UNDO preserves referential integrity. Rolling back transactions in reverse transaction order as is done in the prior art can lead to referential integrity violations and the aborting of rollback transactions, thus corrupting the database.

This example shows an anomaly in the UNDO process. The check is reversed (Tx1 Update) by the UNDO process, but transaction Tx1 cannot complete until Tx2 has committed. However, as seen in Table 3, Tx2 cannot proceed until Tx1 releases its lock on the account. This represents a deadlock. The deadlock is resolved by Tx1 precommitting so that Tx2 can update the account and commit. UNDO will then start a third transaction, Tx3, to complete the work of Tx1. In this case, it is only the commit of Tx1. Precommits are discussed in the section entitled "Precommits."

E. Automating the Recovery Decision Process

In actual practice, the detection of database corruption and its resolution can be a lengthy process. The database that has become corrupted could be stand-alone, or the source or target database in a data replication environment. The algorithms and methods to detect and resolve the corruption discussed above in the sections on UNDO and REDO can be used in the automation steps discussed below. Often, database corruption goes undetected until someone outside the organization notices that something isn't right. The recent theft of 110 million credit cards from Target, a leading retailer, was carried out over a three-week period without Target being aware. The ongoing theft was finally detected by a card-issuing bank who noticed a significant increase in fraudulent payment card activity on their cards and determined that the one common attribute of all of these cards was that they had recently been used at Target stores ("Target Compromises Millions of Payment Cards," *Availability Digest*; January, 2014).

Furthermore, once database corruption has been suspected, it can take an extensive effort to determine its source, its damage, and the optimum procedures to correct the database. The key is to shrink detection and decision time; this can best be accomplished through automation.

The functions of database corruption detection and the recovery decisions can be automated with business rules programmed into user exits in the data replication engine used to implement UNDO and REDO. The decision logic can be incorporated into the replication engine Collector user exit or the replication engine Consumer user exit. It can be distributed between these two user exits. It can be implemented in one or more independent software modules to which the data replication engine components have access, such as the Queue Manager (QMGR) or an external module or modules not shown in the figures.

A simple view of the decision logic is illustrated by the flowchart in FIG. 25. The first step is to continuously monitor for suspected database corruption (1). Monitoring is done via business rules programmed into the user exits. For instance, a massive delete of items from the database might be an indicator of corruption. A higher than normal rate of transaction aborts might be of concern. An increase in complaints from end users or business partners to the company's call centers might be a clue.

To achieve this goal, the user exits must have access to events that can signal potential database corruption. Some of this information can be gleaned from the data flow through the replication engine, such as excessive deletes or transaction aborts. Other information must be provided to the user exits from external sources. Call-center activity is an example of this sort of information.

If database corruption is suspected, corporate policy may require that appropriate IT operations staff be immediately alerted (2). The staff can then begin to analyze the problem and to determine the source of the corruption (3).

Based on information available to the user exits and information provided to them by the operations staff, the user exits can then decide the best way to resolve the corruption (4). Is it better to roll back the corrupted data via UNDO, or would it be faster to use REDO to roll forward correct changes from the latest recovery point (or more precisely, from the most recent uncorrupted recovery point, since some backups may have been taken of the corrupted database (5). In some cases, it may be an iterative process of applying one approach for some forms of corruption, another approach for other forms of corruption, and iteratively repeating the sequence until all corruption has been resolved.

This can be a complex decision and can be greatly aided via automation. Factors to be considered in the UNDO/REDO decision include the following:

1. The availability requirements for the application. If the application must always be up for regulatory or business purposes, REDO typically is not an option, as the application may have to be shut down, perhaps for hours. UNDO must be used to keep the application running.
2. The size of the corruption, perhaps in total data operations affected versus percentage of the database affected. If it is small, use UNDO; if it is massive, use REDO.
3. The state of the database logs and QMGR logs. If the required logs have been deleted because they have exceeded their retention period, recovery by any means other than manual reentry of transactions may be difficult. For this reason, it is best practice to retain logs for weeks, not days.
4. The state of the system. If a hardware fault has caused the corruption, recovery should wait until the hardware has been repaired.
5. The number of end users affected. If only a few end users are affected, UNDO can be effectively used since there will be few corrupting changes to roll back; and processing errors due to corrupted data that has not yet been rolled back will be small.
6. Were there DDL changes? If so, UNDO may not work, and recovery will have to be by REDO.
7. How long has the corruption been going on? If not for very long, use UNDO. Rolling back a few transactions is much faster than rolling forward the entire database.
8. Can some or all of the corrupting database changes be modified so that they can be applied to the database as correct changes? Can they be reformatted, aggregated, de-aggregated, filtered, cleansed, or enhanced with data from other systems?
9. How much logic must be built into the user exits? The decision should lean towards the simpler programming effort.

If the decision is to use UNDO, then the application can continue running as the corrupted changes are rolled back (6). If the decision is to use REDO, the application must typically be stopped (7). The last uncorrupted recovery point must be restored (8), and all subsequent changes rolled forward (9) before the application can be restarted (10).

The decision process can then be repeated, as some corruption sequences might require both UNDO and REDO iteratively. Therefore, once UNDO or REDO is invoked, the decision analysis is re-entered in case there is more to do.

Note that no one knows when UNDO is used, because the application continues to run, even though some data may still be corrupted for a short time. When REDO is run, everyone knows, because the application is down.

F. One Preferred Embodiment

One preferred embodiment for UNDO and REDO are those described in this disclosure that require only one pass through the changes to create a selective reverse operation list for UNDO roll back or to create a selective forward operation list for REDO roll forward. Though many of the embodiments described herein use a queue of changes managed by a queue manager, QMGR, this is not necessary. The selective forward and reverse operation lists can be generated directly from the database's change queue. These embodiments are represented by FIG. 11 for UNDO and FIG. 24 for REDO.

G. Summary

Database corruption can be caused by programming errors, user errors, system faults, and other actions. Should a database become corrupted, it is important to be able to restore it quickly and completely to a consistent state to minimize application downtime and to improve application correctness.

The UNDO and REDO methods described in this specification provide such functionality. By maintaining an Undo Queue of changes that have been made to the database, UNDO can follow the Undo Queue in reverse up to the point of corruption and can reverse any corrupting changes that have been made. Restoration of the database can be to a specified point in time or to a change log position. Optionally, the rollback of corrupted data can be accomplished by UNDO while the application continues its processing functions. UNDO can be configured as a permanent part of an installation, or it may be instantiated following a corruption and cover just the period of the corruption.

UNDO has other uses as well. For instance, it can reverse partial transactions (e.g., split transactions, distributed transactions, and precommitted transactions) that may not have been fully applied to a target database as a result of a system failure. In addition, it can be used to automatically aid in the resolution of hung transactions.

REDO maintains a Redo Queue of all changes that have been made to the database. If a new version of an application is to be run, if a new database version is to be deployed, and/or if some other system change is to be made, a copy of the database before executing the system modification can be created and saved. This is often accomplished by unmirroring the database and saving one of the mirrors. The system is then run with the other mirror. If problems result in database corruption, the saved database copy (e.g., the saved mirror) can be restored quickly. REDO uses selected database changes from its Redo Queue to apply to the saved mirror in order to roll it forward to a current and correct state.

In addition, REDO can be used to automatically aid in the resolution of hung transactions. REDO can be configured as a permanent part of an installation, or it may be instantiated following a corruption and cover just the period of the corruption. In most cases, the application must be stopped during the REDO process, since the database is not current until REDO completes its roll-forward activity.

Helpful reports can be generated from the Undo Queue or Redo Queue to aid in determining the period of corruption and the contributing sources. The scope of corrective activity can be specified by a user or system administrator and can include a time or transaction range, a list of affected files and tables, and a list of sources of corrupted transactions such as users, programs, and others. UNDO and REDO will filter database changes and undo or redo only those specified by the administrator.

In the section above entitled "What is Needed," a list of desirable attributes for rolling forward and rolling back were listed. UNDO and REDO provide all of these attributes except for one—an application typically must be stopped during a REDO operation, although that is usually only during the restoration of the recovery point before the roll-forward sequence begins.

FIG. 26 is a summary flowchart of one preferred embodiment of the REDO process, the details of which were previously described above, wherein a corrupted database is returned to a correct state. In this process, a change queue is maintained that includes changes made to the database. The change queue may be a transaction log, an audit trail, or a database of changes. One or more recovery points are also maintained. At least one recovery point allows for a copy of a correct database to be restored at the time of the recovery point. The method operates as follows:

1. Corruption of the database is detected (step 260). The corruption may be one or more of split transactions, distributed transactions, precommitted transactions, hung transactions, and misbehaving applications.

2. An algorithm is provided that detects changes to the database which potentially caused corruption of the database (step 262). In one preferred embodiment, the algorithm detects changes which caused actual corruption of the database. The algorithm may be implemented by a user exit.

3. A correct copy of the database is restored from one of the recovery points (step 264).

4. Roll forward through the change queue from the recovery point to the first change corrupting the database as determined by the algorithm and apply some or all changes to the database up to the first corrupting change (step 266).

5. Roll forward through the change queue from the first change corrupting the database as determined by the algorithm and apply the changes to the copy of the database in a selective manner (step 268) as follows:

a. Examine each change using the algorithm to determine if the change caused corruption of the database. This step may be implemented by a user exit.

b. Address any changes that caused corruption of the database. This may occur by ignoring the changes or by modifying the changes and then applying the modified changes.

c. Apply without modification some or all changes that were determined not to have caused corruption of the database.

Upon the completion of this process, the corrupted database is returned to a correct state.

In one preferred embodiment, the database is a source database and there is a replicated target database. In this embodiment, the restoring step restores a correct copy of the source and target database from the same recovery point. The method further operates to replicate the changes applied to the source database to the target database (step 269).

In another preferred embodiment, step 4 applies all changes to the database up to the first corrupting change and step 5*c*. applies without modification all changes that were determined not to have caused corruption of the database.

Figure 27:
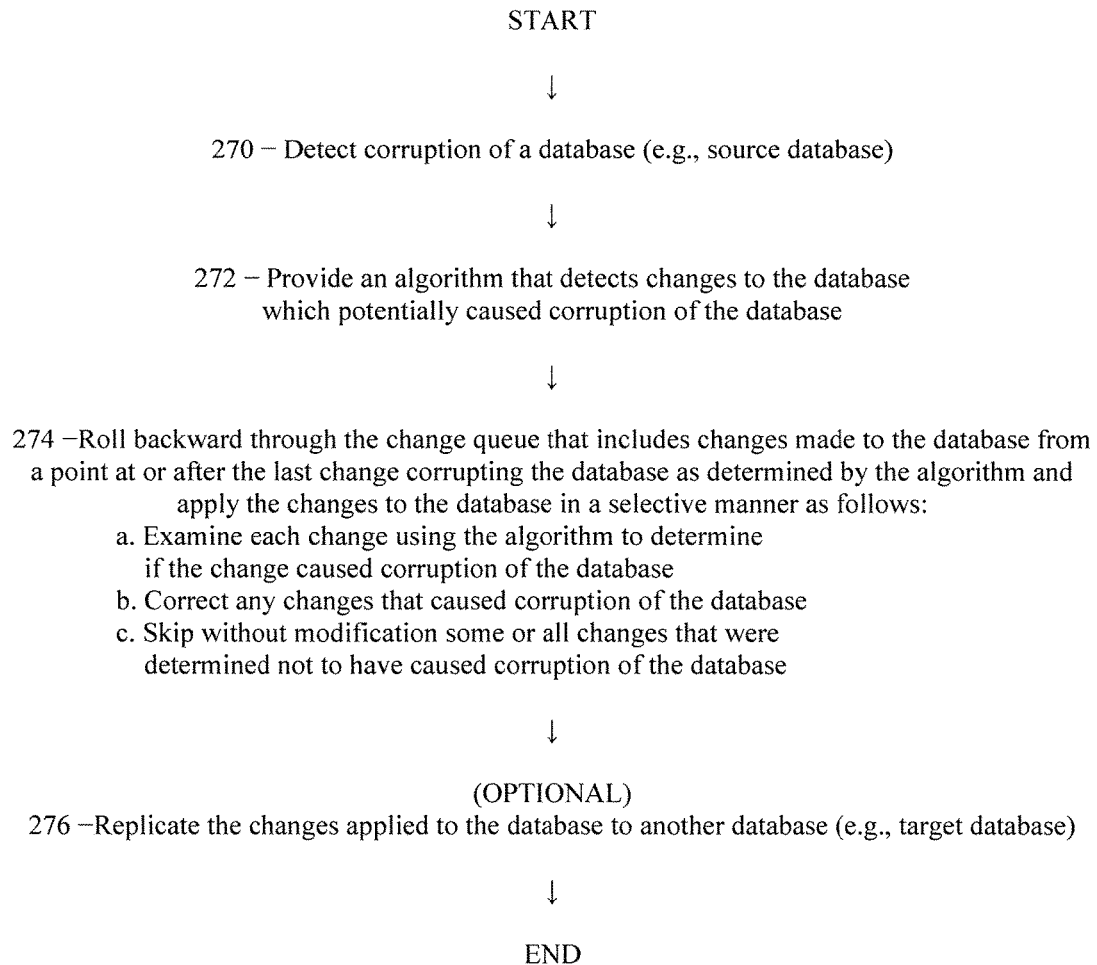
FIG. 27 is a flowchart of an UNDO process in accordance with one preferred embodiment of the present invention.

FIG. 27 is a summary flowchart of one preferred embodiment of the UNDO process, the details of which were previously described above, wherein a corrupted database is returned to a correct state. In this process, a change queue is maintained that includes changes made to the database. The change queue may be a transaction log, an audit trail, or a database of changes. The method operates as follows:

1. Corruption of the database is detected (step 270). The corruption may be one or more of split transactions, distributed transactions, precommitted transactions, hung transactions, and misbehaving applications.

2. An algorithm is provided that detects changes to the database which potentially caused corruption of the database (step 272). In one preferred embodiment, the algorithm detects changes which caused actual corruption of the database. The algorithm may be implemented by a user exit.

3. Roll backward through the change queue from a point at or after the last change corrupting the database as determined by the algorithm and apply the changes to the database in a selective manner (step 274) as follows:

a. Examine each change using the algorithm to determine if the change caused corruption of the database. This step may be implemented by a user exit.

b. Correct any changes that caused corruption of the database. This may occur by applying reverse operations or by modifying the changes and then applying the modified changes.

c. Skip without modification some or all changes that were determined not to have caused corruption of the database.

Upon the completion of this process, the corrupted database is returned to a correct state.

In one preferred embodiment, the database is a source database and there is a replicated target database. In this embodiment, the changes applied to the source database are replicated to the target database. (step 276)

H. Hardware/Software Implementation Details

The present invention may be implemented with any combination of hardware and software. If implemented as a computer-implemented apparatus, the present invention is implemented using means for performing all of the steps and functions described above.

When implemented in software, the software code can be executed on any suitable processor or collection of processors, whether provided in a single computer or distributed among multiple computers.

The present invention can also be included in an article of manufacture (e.g., one or more computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s)/processor(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The computer(s)/processor(s) may have one or more input and output devices. These devices can be used, among other things, to present a user interface. Examples of output devices that can be used to provide a user interface include printers or display screens for visual presentation of output and speakers or other sound generating devices for audible presentation of output.

Examples of input devices that can be used for a user interface include keyboards, and pointing devices, such as mice, touch pads, and digitizing tablets. As another example, a computer may receive input information through speech recognition or in other audible format.

Such computers/processors may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in non-transitory computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method of returning a database, corrupted by a corrupting change, to a correct state, the database having a change queue tracking changes to the database, a recovery point for restoring the database to an uncorrupted state prior to the corrupting change, the method comprising:
   detecting the corrupting change to the database;
   setting a marker based on detecting the corrupting change, the marker defining a pre-change database portion and a post-change database portion; and
   repairing the database while continuing to use the database, such use including modifying the post-change database portion, the repairing including:
   reverting the database back to the recovery point;
   determining a set of redo instructions, based on the change queue, to redo transactions up to the marker;
   determining a subset of the set of instructions based at least in part on removing any transactions offset by other transactions in the set of instructions;
   applying the subset of the instructions to the pre-change database portion; and
   determining the correct state of the corrupted database based at least in part on combining the pre-change database portion and the post-change database portion.

2. The method of claim 1, wherein the determining the set of redo instructions comprises:
   determining a forward set of instructions to roll forward from the recovery point; and
   determining a backward set of instructions to roll backward from the marker.

3. The method of claim 2, wherein the determining the set of redo instructions is based at least in part on applying a metric to identify a faster combination of selected ones of the forward set of instructions and the backward set of instructions.

4. The method of claim 1 wherein the determining the subset of instructions further comprises:
   an algorithm that detects corrupting changes to the database;
   applying the algorithm to the set of instructions to identify changes to the database that did not cause corruption to the database;
   determining a new recovery point based at least in part on rolling forward through the change queue and applying changes to the database up to a first corrupting change; and
   setting a start of the subset of instructions to be after the new recovery point.

5. The method of claim 4, further comprising:
   applying the algorithm to the set of instructions to identify corrupting changes to the database; and
   determining one or more corrected changes based on correcting at least one corrupting change in the set of instructions;
   wherein determining the new recovery point includes rolling forward through the change queue and applying the one or more corrected changes after the first corrupting change, and wherein determining the new recovery point is performed after the correcting the corrupting changes.

6. The method of claim 5, wherein the correcting the corrupting changes stops at a first uncorrectable corrupting change.

7. The method of claim 1, wherein an algorithm that detects changes to the database detects changes which caused actual corruption of the database.

8. The method of claim 1, further comprising:
   replicating changes, applied in the applying the subset of the instructions, to a replicated database replicating the database.

9. A system for returning a database, corrupted by a corrupting change, to a correct state, the database having a change queue tracking changes to the database, a recovery point for restoring the database to an uncorrupted state prior to the corrupting change, the method comprising:
   means for detecting the corrupting change to the database;
   means for setting a marker based on detecting the corrupting change, the marker defining a pre-change database portion and a post-change database portion; and means for repairing the database while continuing to use the database, such use including modifying the post-change database portion, the repairing including:

means for reverting the database back to the recovery point;

means for determining a set of instructions, based on the change queue, to redo transactions up to the marker;

means for determining a subset of the set of instructions based at least in part on removing any transactions offset by other transactions in the set of instructions;

means for applying the subset of the instructions to the pre-change database portion; and means for determining the correct state of the corrupted database based at least in part on combining the pre-change database portion and the post-change database portion.

10. The system of claim 9, the means for determining the set of instructions to redo transactions up to the marker further comprising:

means for determining a forward set of instructions to roll forward from the recovery point; and means determining a backward set of instructions to roll backward from the marker.

11. The system of claim 9 wherein the means for determining the subset of instructions further comprises:

means for an algorithm that detects corrupting changes to the database;

means for determining one or more corrected changes based on correcting at least one corrupting change in the set of instructions;

wherein determining a new recovery point includes rolling forward through the change queue and applying the one or more corrected changes after a first corrupting change, and wherein determining the new recovery point is performed after the correcting the corrupting changes.

12. One or more non-transitory computer-readable media having instructions for a machine having at least one processor, to provide for returning a database, corrupted by a corrupting change, to a correct state, the database having a change queue tracking changes to the database, a recovery point for restoring the database to an uncorrupted state prior to the corrupting change, in response to execution by the machine, cause the machine to:

detect the corrupting change to the database;

set a marker based on detecting the corrupting change, the marker defining a pre-change database portion and a post-change database portion; and repair the database while continuing to use the database, such use including modifying the post-change database portion, the repairing including:

revert the database back to the recovery point;

determine a set of redo instructions, based on the change queue, to redo transactions up to the marker;

determine a subset of the set of instructions based at least in part on removing any transactions offset by other transactions in the set of instructions;

apply the subset of the instructions to the pre-change database portion; and determine the correct state of the corrupted database based at least in part on combining the pre-change database portion and the post-change database portion.

13. The one or more computer-readable media of claim 12, further comprising instructions to perform:

determine a forward set of instructions to roll forward from the recovery point; and determine a backward set of instructions to roll backward from the marker.

14. The one or more computer-readable media of claim 12, wherein the instructions to perform the determining the set of redo instructions further comprise instructions to apply a metric to identify a faster combination of selected ones of the forward set of instructions and the backward set of instructions.

15. The one or more computer-readable media of claim 12, further comprising instructions to perform:

an algorithm that detects corrupting changes to the database;

apply the algorithm to the set of instructions to identify changes to the database that did not cause corruption to the database;

determine a new recovery point based at least in part on rolling forward through the change queue and applying changes to the database up to a first corrupting change;

set a start of the subset of instructions to be after the new recovery point;

apply the algorithm to the set of instructions to identify corrupting changes to the database; and determine one or more corrected changes based on correcting at least one corrupting change in the set of instructions;

wherein determining the new recovery point includes rolling forward through the change queue and applying the one or more corrected changes after the first corrupting change, and wherein determining the new recovery point is performed after the correcting the corrupting changes.

* * * * *